United States Patent
Trachtenberg

[11] Patent Number: 6,121,747
[45] Date of Patent: Sep. 19, 2000

[54] ELECTRIC MOTOR CONTROLLER

[75] Inventor: Roman Trachtenberg, Rehovot, Israel

[73] Assignee: Servologic Ltd., Rehovot, Israel

[21] Appl. No.: 08/921,903

[22] Filed: Sep. 2, 1997

[51] Int. Cl.[7] .................................................. H02P 5/34
[52] U.S. Cl. .......................... 318/800; 318/809; 318/600; 388/805; 388/911
[58] Field of Search ........................... 318/778–811, 438, 318/592, 594, 602, 603, 604, 615, 600; 388/804, 805, 811, 812, 813, 819, 820, 911

[56] References Cited

U.S. PATENT DOCUMENTS

| | | | |
|---|---|---|---|
| 3,829,747 | 8/1974 | Woolfson et al. | 318/702 |
| 4,357,569 | 11/1982 | Iwakane et al. . | |
| 4,358,726 | 11/1982 | Iwakane et al. | 318/798 |
| 4,361,792 | 11/1982 | Davis, Jr. et al. | 318/729 |
| 4,489,267 | 12/1984 | Saar et al. . | |
| 4,588,936 | 5/1986 | Itoh et al. | 318/694 |
| 4,621,224 | 11/1986 | Watabe et al. | 318/594 |
| 4,680,518 | 7/1987 | Kurakake et al. | 318/561 |
| 4,689,539 | 8/1987 | Unno et al. | 318/594 |
| 4,772,838 | 9/1988 | Maresca | 318/687 |
| 4,795,950 | 1/1989 | Ota et al. . | |
| 4,808,902 | 2/1989 | Miyazaki et al. | 318/798 |
| 4,893,066 | 1/1990 | Stewart et al. | 318/600 |
| 5,010,287 | 4/1991 | Mukai et al. | 318/801 |
| 5,140,245 | 8/1992 | Stacey | 318/723 |
| 5,325,460 | 6/1994 | Yamada et al. | 388/811 |
| 5,367,241 | 11/1994 | Lee et al. | 318/799 |
| 5,433,541 | 7/1995 | Hieda et al. | 400/279 |
| 5,467,004 | 11/1995 | Matsuo et al. . | |
| 5,495,161 | 2/1996 | Hunter . | |
| 5,533,166 | 7/1996 | Yoshida et al. | 388/811 |
| 5,694,015 | 12/1997 | Luniewicz et al. | 318/611 |
| 5,731,681 | 3/1998 | Inaniwa et al. | 318/729 |
| 5,907,298 | 5/1999 | Kiriyama et al. | 341/111 |

FOREIGN PATENT DOCUMENTS

| | | |
|---|---|---|
| 1107241 | 8/1984 | Russian Federation . |
| 1434532 | 10/1988 | Russian Federation . |

OTHER PUBLICATIONS

Brochure: Philips Semiconductor Catalogue, *Digital Phase–Locked–Loop Filter*, pp. 569,572, Sep. 1993.

*Primary Examiner*—Brian Sircus
*Attorney, Agent, or Firm*—Darby & Darby

[57] ABSTRACT

A controller for an electric motor, includes a reference circuit and control circuitry. The reference circuit generates a reference signal having a phase and frequency determined in accordance with a set of motion parameters input to the circuit. The control circuitry receives the reference signal and receives a feedback signal from a rotation detector coupled to the motor, the detector having a predetermined rotational resolution, and compares the reference signal and the feedback signal to generate a drive signal used to drive the motor at a speed and phase of rotation determined by the frequency and phase of the reference signal. The phase of rotation of the motor is locked to the phase of the reference signal such that deviation of the phase of rotation relative to the phase of the reference signal at steady state is substantially smaller than the rotational resolution of the rotation detector.

26 Claims, 19 Drawing Sheets

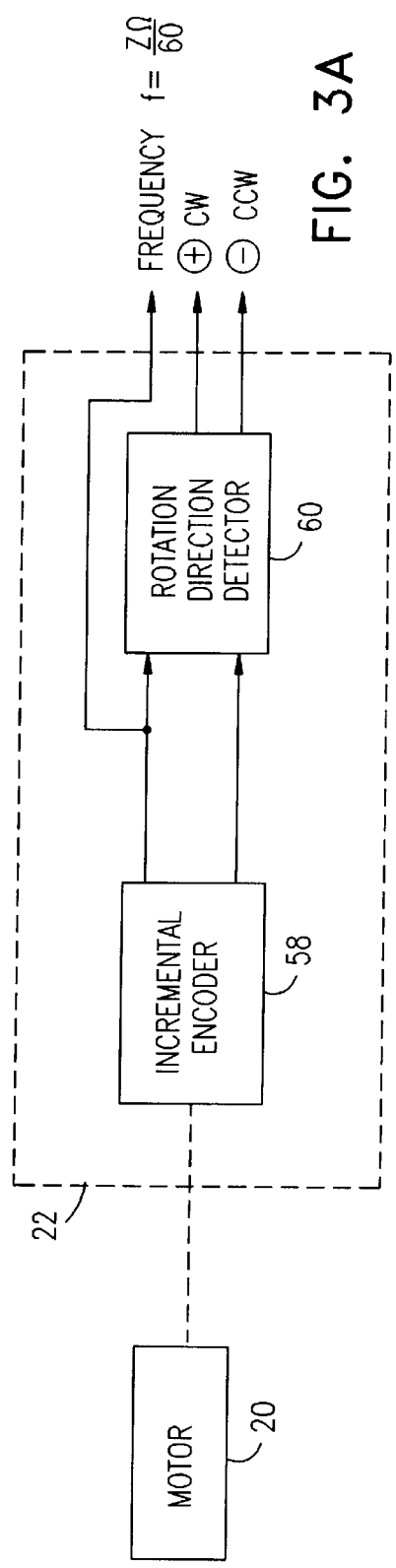
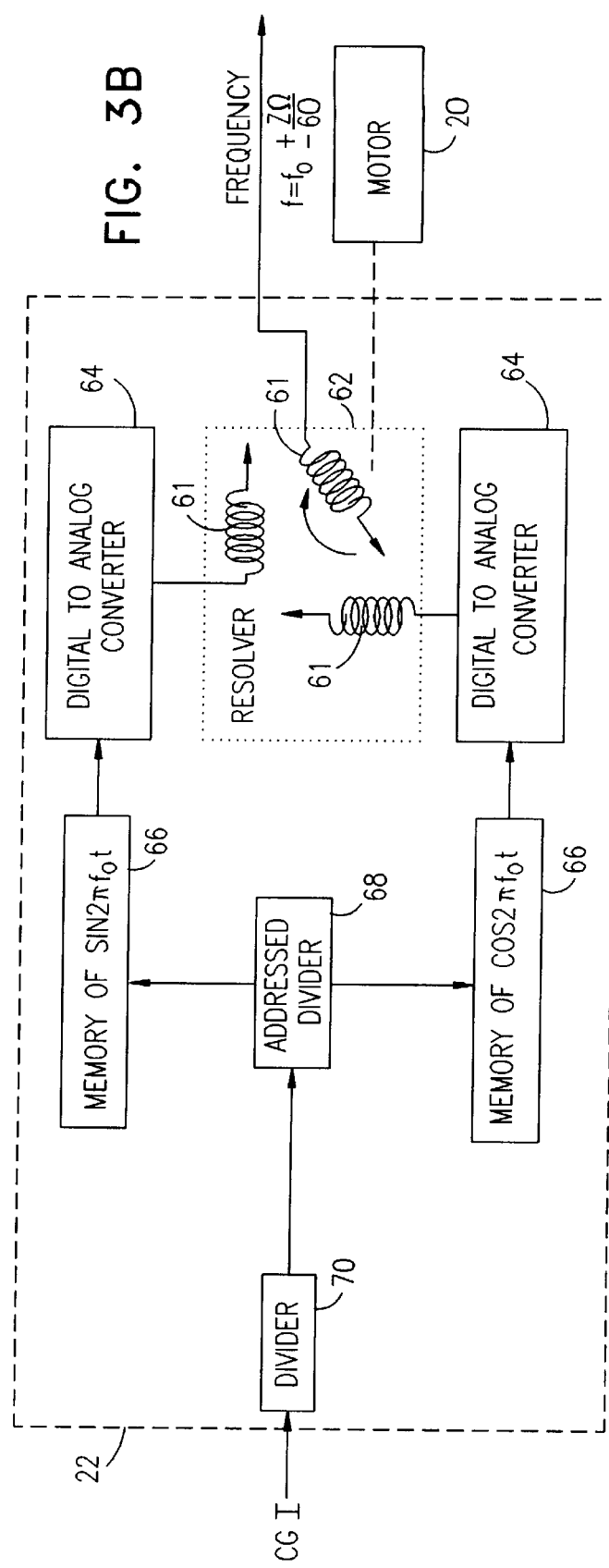

ELECTRIC MOTOR CONTROLLER

FIELD OF THE INVENTION

The present invention relates generally to electric motor control and specifically to methods and apparatus for phase, speed and position control of electric motors.

BACKGROUND OF THE INVENTION

Accurate motion control is necessary in many applications involving electric motors. Typically, the control is needed over one or more of the motion parameters, i.e., speed, location and phase, with varying degrees of precision. Such control is generally achieved by automatic control systems, for example, phase-locked speed controllers.

FIG. 1 is a schematic illustration of a phase-locked speed controller system 18, as is known in the art. A rotation detector 22 detects the rotational speed $\Omega_E$ of a motor 20 and generates an output pulse train having a frequency $f_E$ and a phase $\Phi_E$, in response thereto. External speed and phase reference values and a clock signal of a frequency $f_{clock}$, generated by a clock generator 28, are input to a programmable reference 25, which generates a reference pulse train of a frequency $f_R$ and a phase $\Phi_R$. A correction device 24 receives the feedback and reference pulse trains and generates a feedback pulse train of a frequency fE and a phase $\Phi_F$. A phase-frequency comparator 30, comprising, for example, an edge-controlled digital memory network, as is known in the art, compares the frequency and phase of the feedback pulse train to those of the reference pulse train, and generates a duty cycle-modulated signal of having a duty cycle $\gamma_1$ in response to the difference between the two sets of values. The duty cycle signal is input to an integrator 32 to further generate a low-frequency pulse width-modulated (PWM) signal. This signal is output to a motor drive 36, which drives motor 20 in response thereto.

Control systems like system 18 typically exhibit large and irregular overshoot, i.e., slow convergence of speed transients. These problems are mainly due to low-frequency reference and feedback signals, whose frequencies can be varied only in discrete steps, as well as low-frequency PWM driving signals and slow response time of the phase control system. The system is typically subject to phase errors due to a "dead zone" effect in the integration circuit at low duty cycle pulse widths. There is no accurate and reliable way of controlling motor speeds in the range below a few tens of rpm, employing the above-described control systems. Similarly, there is no straightforward way for systems like system 18 to control with any accuracy the shaft position of the motor.

Attempts at improving one or more of the controlling parameters of phase-locked control systems have been performed mostly in relation to specific, dedicated applications, such as in video and digital audio recorders and players, where rapid response, i.e., rapid phase convergence during speed transients, is mandatory.

For example, U.S. Pat. No. 4,795,950, to Ota, et al., which is incorporated herein by reference, describes methods and apparatus for phase control of video and audio digital recorder motors with rapid phase convergence using a resettable phase signal generating circuit for producing a reference phase signal. The signal generating circuit is reset in response to a speed signal when the speed is in a prescribed range, thus controlling the phase convergence time in response to changes in the speed, i.e., during speed transients.

At present, users of control systems have a choice between microprocessor-based and pulse logic control techniques. The availability of high-power microprocessors makes them suitable for many applications. Nevertheless, the simplicity, low cost and inherent high precision of pulse logic methods make them a preferred choice whenever applicable.

SUMMARY OF THE INVENTION

It is an object of some aspects of the present invention to provide a reliable and accurate method and apparatus for automatic speed, phase and/or position control of an electric motor.

It is a further object of some aspects of the present invention to provide a reliable and accurate apparatus and method for automatic control at low rotation speeds of an electric motor.

Methods and apparatus in accordance with preferred embodiments of the present invention use novel pulse logic processing techniques to achieve high-precision motion control functions. These techniques, as described hereinbelow, eliminate some of the problems known to affect the accuracy and reliability of motion control systems known in the art.

In preferred embodiments of the present invention, a motion controller for an electric motor comprises a rotation detector, which detects the rotation speed and direction of the motor and generates a feedback pulse train in response thereto; and a reference circuit, which generates a reference pulse train, having a frequency and phase representative of externally preset motion parameters, including motor speed, phase and position. A speed and phase control circuit, receives and processes the feedback and reference pulse trains to generate a duty cycle-modulated control signal. This signal is processed by a high-frequency pulse-width modulation (PWM) converter, to generate a PWM control input to a motor driver, which provides input power to the motor. A clock generator, generates a clock signal, preferably multiple clock signals, which are used as a frequency base in the controller.

The rotation detector detects the motion parameters of the rotating electric motor, i.e., the rotational speed, the instantaneous direction of rotation, and optionally, the instantaneous position relative to a predetermined zero position. Most preferably, the rotation detector comprises an incremental encoder, as is known in the art, as for example an optical or magnetic encoder, which is adapted to additionally detect the instantaneous direction of rotation.

Alternatively, the rotation detector comprises a resolver, also known in the art, which detects the rotational speed and direction. The resolver translates the rotational speed into a speed signal of a certain frequency and phase, corresponding to the instantaneous actual rotational speed and phase of the motor. Preferably, the resolver generates a direction-of-rotation signal and a position signal, as well.

The rotation detector typically has an inherent predetermined rotational resolution. This resolution is determined, by aspects of the design of the detector, such as the number of division marks of an encoder, or the number of poles and circuit characteristics of a resolver. In some preferred embodiments of the present invention, as described hereinbelow the control circuit regulates the rotation of the motor to within a steady state phase deviation substantially less than the resolution of the detector.

In some preferred embodiments of the present invention, the reference circuit comprises a speed reference circuit, comprising a plurality of divider-multiplier cascades (DMCs), preferably, two such cascades in series. The cascades enable an incremental transformation of the frequency of the reference pulse train so as to enable a smooth, quasi-continuous variation of the motor's speed, by properly determining the DMC's division (D) and multiplication (N) coefficients and transformation function. Accordingly, arbitrarily small changes in the frequency of the reference pulse train may be achieved. A further benefit of the such DMCs is the elimination of the voltage-controlled oscillator (VCO) and low-pass filter that are commonly used in phase-locked loop frequency multipliers known in the art. The elimination of these components adds simplicity and stability and decreases susceptibility to external disturbances, resulting in an overall enhancement of the controller's performance.

In alternative preferred embodiments of the present invention, the reference circuit comprises two parallel speed reference circuits. Each reference circuit is characterized by a respective speed reference input, DMC coefficients and frequency transformation function. Two different, transformed speed reference signals are generated, which may have an arbitrarily small difference therebetween. This small difference frequency is used to drive the motor accurately at very low speeds.

The capability of these preferred embodiments to vary the frequency of the reference pulse train precisely and substantially continuously enables accurate, rapidly-converging speed control over a wide range of rotational speeds, including values ranging between practically zero to few tens of rpm. Another beneficial aspect of these abilities is the resulting substantial increase in the dynamic range (defined as the ratio between the maximal and minimal controllable and allowable rotation speeds) of motors. These capabilities cannot generally be achieved by conventional phase-locked motion controllers, known in the art.

Preferably, the reference circuit further comprises a control circuit, which processes the reference pulse train responsive to external reference inputs, so that the pulse train has a frequency and phase corresponding to the complete set of inputs, when applicable. Preferably, the external reference inputs comprise a speed and phase reference. Additionally or alternatively, the inputs comprise a grip/move and/or a position reference signal.

In some preferred embodiments of the present invention, the clock generator comprises two clock units, which generate two asynchronous clock signals. A first clock signal is used as a clock base for the reference circuit, as well as for other circuits of the controller. A second clock signal, asynchronous with the first clock signal, is input to the speed and phase control circuit, as described below.

In some preferred embodiments of the present invention, the speed and phase control circuit comprises a pulse add-remove circuit, which adds the feedback and reference signals input to the control circuit with a respective increases or decreases of the frequency, generally in order to include direction of rotation in the output signal. Alternatively or additionally, the addition of the signals is performed in order to enable control of the motor when it rotates at speeds ranging from close to zero to tens of rpm or even when its continuous rotation is interrupted. A correction circuit further processes the signal output from the pulse add-remove circuit to generate a modified feedback signal input to a logic phase-frequency comparator (LPFC), most preferably comprising a five-state, edge-controlled digital memory network along with a reference signal. The LPFC generates a duty cycle-modulated signal output to the PWM converter.

In some preferred embodiments of the present invention, the speed and phase control circuit comprises an automatic phasing circuit, coupled to the LPFC and generating the reference signal input thereto, as mentioned above, such that fast converging, accurate control during speed transients, i.e., acceleration or deceleration are achieved.

In some preferred embodiments of the present invention, the duty cycle signal is further processed by the speed and phase control circuit, so as to enhance the accuracy of the controller by first and, optionally, second astatism. The term "statism" refers to a deviation in the steady-state rotation of a motor, relative to a given reference input, due to a change in the load applied to the motor, whereas the term "astatism" refers to the elimination of "statism," generally by an integration function of the control system. Accordingly, the term "first astatism" (first integral), as used in the present patent application and in the claims, refers to the substantial elimination of deviation in steady-state (SS) rotational speed, $\Omega_{ss}$, of the motor, i.e., first astatism is equivalent to maintaining $\Delta\Omega_{ss}=0$. Similarly, the term "second astatism" (second integral) is equivalent to substantially maintaining $\Delta\Phi_{ss}=0$, wherein $\Delta\Phi$ denotes phase deviation relative to the reference and is the result of integrating $\Delta\Omega_{ss}$ over time. Second astatism is achieved through a novel integration algorithm which is substantially free of "dead zone" and discretization errors, i.e., errors in the steady-state phase of the motor due to the limited resolution of the rotation measuring device and of the reference pulse train.

Preferably, the duty cycle-modulated signal is preprocessed by a duty cycle to phase-frequency converter and input to a second LPFC, which generates a modified duty cycle-modulated signal. This modified signal is preferably input to the high frequency PWM converter. Alternatively, the modified signal may be used as an input to an additional similar processing stage, which further enhances the accuracy of the controller. The duty-cycle to phase-frequency conversion stage eliminates discretization errors that normally occur in duty cycle to digital signal conversion. In some preferred embodiments of the present invention, the signal processing step comprising the duty-cycle to phase-frequency converter receives and utilizes two asynchronous clock signals and pulse edge detection to eliminate integration "dead zone" errors to which integration steps are subject due to finite resolution, as described above.

The high-frequency PWM converter converts the duty cycle-modulated signals from the speed and phase controller into high-frequency pulse width-modulated output signals, which are input to the motor drive circuit. The application of a high-frequency control signal decreases the motor's response time, as well as reducing speed, phase and motor current fluctuations and further enhances the accuracy of the controller.

There is therefore provided in accordance with a preferred embodiment of the present invention a controller for an electric motor, including:

a reference circuit which generates a reference signal having a phase and frequency determined in accordance with a set of motion parameters input to the circuit; and control circuitry, which receives the reference signal and receives a feedback signal from a rotation detector coupled to the motor, the detector having a predetermined rotational resolution, and compares the reference signal and the feedback signal to generate a drive signal used to drive the motor at a speed and phase of rotation determined by the frequency and phase of the reference signal, the phase of rotation of the motor being locked to the phase of the reference signal such that deviation of the phase of rotation relative to the phase of the reference signal at steady state is substantially smaller than the rotational resolution of the rotation detector.

Preferably, the controller includes a motor drive, which receives the drive signal from the control circuitry and drives the motor responsive thereto.

Further preferably, the feedback signal is a periodic signal having a frequency and phase dependent on the rotation of the motor, and the drive signal includes a pulse width-modulated pulse train having a substantially higher pulse frequency than the feedback signal generated by the rotation detector.

Additionally or alternatively, the control circuitry includes a first phase-frequency comparator, which generates a phase-frequency signal responsive to the deviation between the phase of the reference and the phase of rotation of the motor, and the phase-frequency signal is processed to generate the drive signal.

Preferably, the phase-frequency signal includes a pulse train, wherein the pulses in the train are duty cycle-modulated, such that the duty cycle of the pulses is generally proportional to the phase deviation.

Preferably, the control circuitry includes an integration circuit, which receives and integrates the phase-frequency signal to generate a modified phase-frequency signal, responsive to the phase-frequency signal and the feedback signal, wherein the modified phase-frequency signal is characterized by a second-order astatism.

Additionally or alternatively, the integration circuit includes a second phase-frequency comparator.

Preferably, the reference signal and the control circuitry receive a first clock signal, and generate the reference and phase-frequency signals responsive thereto, and the integration circuit receives a second clock signal, asynchronous with the first clock signal, and uses the second clock signal to generate the modified phase-frequency signal.

Further preferably, the controller includes an additional integration circuit, which receives and integrates the modified phase-frequency signal to generate a further modified phase-frequency signal characterized by a third or higher order astatism.

Preferably, the modified phase-frequency signal includes a pulse-width modulated signal.

Additionally or alternatively, the controller includes an automatic phasing circuit, which modifies a phase of the phase-frequency signal responsive to a change in operating conditions of the motor.

Preferably, the automatic phasing circuit modifies the phase responsive to a change in motor speed.

Alternatively, the automatic phasing circuit modifies the phase responsive to a change in motor shaft load.

Further alternatively, the automatic phasing circuit modifies the phase responsive to a change in motor supply voltage.

Preferably, the automatic phasing circuit modifies the phase such that the motor is driven to respond to the change substantially without overshoot or undershoot.

Further preferably, the control circuitry includes a pulse add-remove circuit, which combines the reference and feedback signals to provide a sequence of pulses, which is processed to provide an input to the phase-frequency comparator, such as to enable continuous control of the operation of the motor when it rotates at a speed substantially lower than the reference speed.

Preferably, the motor rotates at a speed less than 10 rpm, more preferably less than 1 rpm, and most preferably less than 0.1 rpm.

In a preferred embodiment, the reference circuit includes a speed reference circuit, which transforms the reference signal to provide a modified reference signal, such that the difference in the pulse frequencies of the reference signal and the modified reference signal is significantly less than the frequency of the reference signal, and the sequence of pulses is processed to provide an input to the phase-frequency comparator.

Preferably, the frequency of the input sequence of pulses produced by the speed reference circuit is controlled to regulate the speed of rotation of the motor.

Alternatively, the phase of the input sequence of pulses is controlled to regulate the phase of rotation of the motor.

Further alternatively, the input sequence of pulses is controlled so as to drive the motor to a predetermined rotational position.

Preferably, the drive signal drives the motor to rotate at a steady-state speed less than 50 rpm, more preferably less than 10 rpm, and most preferably less than 1 rpm.

Preferably, the drive signal drives the motor such that deviation of the phase of rotation relative to the phase of the reference signal at steady state is less than half the angular resolution of the rotation detector.

Further preferably, the deviation at steady state is less than 10% of the angular resolution of the rotation detector, most preferably the deviation at steady state is less than 5% of the angular resolution of the rotation detector.

There is further provided in accordance with a preferred embodiment of the present invention a controller for an electric motor, including:

a reference circuit which generates a reference signal having a phase and frequency determined in accordance with a set of motion parameters input to the circuit; and control circuitry, which receives the reference signal and receives a feedback signal from a rotation detector coupled to the motor, and compares the reference signal and the feedback signal to generate a drive signal used to drive the motor at a speed and phase of rotation determined by the frequency and phase of the reference signal, such that when the frequency of the reference signal is changed to a new frequency thereof, the control circuitry generates the drive signal such that the speed of rotation of the motor changes to a new speed, determined by the new frequency, substantially without overshoot or undershoot.

Preferably, the controller includes a motor drive, which receives the drive signal from the control circuitry and drives the motor responsive thereto.

Further preferably, the drive signal includes a pulse width-modulated pulse train having a substantially higher pulse frequency than the feedback signal generated by the rotation detector.

Still further preferably, the feedback signal is a periodic signal having a frequency and phase dependent on the rotation of the motor, and the control circuitry includes a phase-frequency comparator, which generates a signal responsive to a phase deviation between the phase of the reference signal and the phase of rotation of the motor, and the signal is processed to generate the drive signal.

Also preferably, the controller includes an automatic phasing circuit, which controls the phase-frequency comparator responsive to a change in the motion parameters, so as to prevent the overshoot or undershoot.

Preferably, the automatic phasing circuit modifies the phase responsive to a change in motor speed.

Alternatively, the automatic phasing circuit modifies the phase responsive to a change in motor shaft load.

Further alternatively, the automatic phasing circuit modifies the phase responsive to a change in motor supply voltage.

In a preferred embodiment, the phase-frequency comparator includes an edge-controlled digital memory network, having a plurality of states. The network makes transitions among the plurality of states responsive to the reference and feedback signals input to the comparator, and the signal generated by the comparator is dependent on the state of the network, and the automatic phasing device controls the transitions among the states.

Further preferably, the plurality of states includes five states, having ten possible transitions therebetween, wherein the five states include two saturation states, two work states and a zero state.

There is additionally provided in accordance with a preferred embodiment of the present invention a controller for an electric motor, including:
- a reference circuit which generates a reference signal having a phase and frequency determined in accordance with a set of motion parameters input to the circuit; and
- control circuitry, which receives the reference signal and receives a periodic feedback signal, having a frequency and phase dependent on the rotation of the motor, from a rotation detector coupled to the motor, and compares the reference signal and the feedback signal to generate a drive signal used to drive the motor at a speed and phase of rotation determined by the frequency and phase of the clock signal,
- the drive signal including a sequence of pulses having a pulse repetition frequency substantially higher than the frequency of the feedback signal.

The controller preferably includes a motor drive, which receives the drive signal from the control circuitry and drives the motor responsive thereto.

Preferably, the sequence of pulses in the drive signal includes a series of pulse bursts, wherein the number of pulses in each burst is generally dependent on a phase deviation between the phase of the reference and the phase of rotation of the motor.

Still further preferably, the drive signal includes a pulse-width modulated signal.

There is furthermore provided in accordance with a another preferred embodiment of the present invention a controller for an electric motor, including:
- a clock generator, which generates a clock signal having a substantially constant frequency;
- a reference circuit which generates a reference signal responsive to the clock signal, having a phase and frequency determined in accordance with a set of motion parameters input to the circuit, such that the phase and frequency may be varied substantially continuously in response to the motion parameters; and
- control circuitry, which receives the reference signal and receives a feedback signal from a rotation detector coupled to the motor, and compares the reference signal and the feedback signal to generate a drive signal used to drive the motor at a speed and phase of rotation determined by the frequency and phase of the reference signal.

Preferably, the reference circuit generates the reference signal without dependence on a variable-frequency oscillator.

Further preferably, the reference circuit generates the reference signal without dependence on a low-pass filter.

In a preferred embodiment, the reference circuit includes one or more programmable frequency dividers and one or more programmable frequency multipliers, which receive the clock signal and the motion parameters and produce the reference signal.

Preferably, at least one of the one or more dividers and at least one of the one or more multipliers are arranged in series.

Further preferably, the one or more multipliers and one or more dividers include two pairs of one multiplier and one divider each, each pair arranged in series, and the two pairs arranged mutually in parallel.

Alternatively, the reference circuit includes a phase-frequency comparator and a pulse add-remove circuit, which adjust the reference signal responsive to a change in the set of motion parameters, so that the motor is driven to respond to the change substantially continuously.

Preferably, the controller includes a motor drive, which receives the drive signal from the control circuitry and drives the motor responsive thereto.

There is additionally provided in accordance with a preferred embodiment of the present invention a controller for an electric motor, including:
- a clock generator which generates first and second mutually asynchronous clock signals, each having a known phase and frequency;
- a reference circuit which receives the first clock signal, and generates a reference signal having a phase and frequency determined in accordance with a set of motion parameters input to the circuit; and
- control circuitry, which receives the second clock signal and the reference signal and receives a feedback signal from a rotation detector coupled to the motor, and compares the reference signal and the feedback signal to generate a drive signal based on the second clock signal, and the drive signal is used to drive the motor at a speed and phase of rotation determined by the frequency and phase of the reference signal.

Preferably, the phase of rotation of the motor is locked to the phase of the reference signal, immediately after the motor speed reaches the reference speed value, such that deviation of the phase of rotation relative to the phase of the reference signal at steady state is substantially smaller than the rotational resolution of the rotation detector.

Further preferably, the control circuitry includes a phase-frequency comparator, which uses the second clock signal to generate a phase-frequency signal responsive to the deviation between the phase of the reference and the phase of rotation of the motor.

In a preferred embodiment, the control circuitry includes one or more duty cycle to phase frequency converters and one or more logic phase-frequency comparators, arranged in series, to generate the drive signal.

Preferably, the controller includes a motor drive, which receives the drive signal from the control circuitry and drives the motor responsive thereto.

There is moreover provided in accordance with a preferred embodiment of the present invention a method for controlling an electric motor, including:
- generating a reference signal having a phase and frequency determined in accordance with a set of motion parameters input to the circuit;
- receiving a feedback signal from a rotation detector coupled to the motor, the detector having a predetermined rotational resolution; and generating a drive signal by comparing the reference signal and the feedback signal, to drive the motor at a phase and speed of rotation determined by the frequency and phase of the reference signal, so that the phase of rotation of the motor is locked to the phase of the reference signal, immediately after the motor speed reaches the reference speed value, such that deviation of the phase of rotation relative to the phase of the reference signal at steady state is substantially smaller than the rotational resolution of the sensing device.

Preferably, receiving the feedback signal includes receiving a periodic signal having a frequency and phase dependent on the rotation of the motor.

Further preferably, generating the drive signal includes generating a pulse width-modulated pulse train having a substantially higher pulse frequency than the feedback signal.

Preferably, comparing the reference signal and the feedback signal includes generating a phase-frequency signal responsive to the deviation between the phase of the reference and the phase of rotation of the motor, and the phase-frequency signal is processed to generate the drive signal.

Further preferably, generating the phase-frequency signal includes generating a train of duty cycle-modulated pulses, wherein the duty cycle of the pulses is generally proportional to the phase deviation.

In a preferred embodiment, generating the drive signal includes integrating the phase-frequency signal to generate a modified phase-frequency signal, responsive to the phase-frequency signal and the feedback signal, and the modified phase-frequency signal is characterized by a second-order astatism.

Preferably, integrating the phase-frequency signal includes comparing a phase of the phase-frequency signal to the phase of the feedback signal.

Further preferably, generating the reference and phase-frequency signals includes generating the signals responsive to a first clock input, and wherein generating the modified signal includes generating the signal responsive to a second clock input, asynchronous with the first clock input.

Alternatively, generating the drive signal includes integrating the modified signal to produce a further modified signal having a third- or higher-order astatism.

Additionally or alternatively, generating the drive signal includes automatically modifying a phase of the phase-frequency signal responsive to a change in operating conditions of the motor.

Preferably, modifying the phase includes modifying the phase responsive to a change in motor speed.

Alternatively, modifying the phase includes modifying the phase responsive to a change in motor shaft load.

Optionally, modifying the phase includes modifying the phase responsive to a change in motor supply voltage.

Preferably, modifying the phase includes modifying the phase such that the motor is driven to respond to the change substantially without overshoot or undershoot.

Further preferably, generating the drive signal includes combining the reference and feedback signals to provide an input sequence of pulses, and processing the input sequence of pulses to provide an input to the phase-frequency comparator, such as to enable continuous control of the operation of the motor when it rotates at a speed substantially lower than the reference speed.

Preferably, processing the input sequence of pulses includes controlling a frequency of the sequence to regulate the speed of rotation of the motor.

Alternatively, processing the input sequence of pulses includes controlling a phase of the sequence to regulate the phase of rotation of the motor.

Optionally, processing the input sequence of pulses includes controlling the sequence so as to drive the motor to a predetermined rotational position.

Preferably, generating the drive signal includes generating a signal to drive the motor at a steady-state speed less than 50 rpm, more preferably less than 10 rpm, and most preferably, less than 1 rpm.

Preferably, generating the drive signal includes generating a signal to drive the motor such that deviation of the phase of rotation relative to the phase of the reference signal at steady state is less than half the angular resolution of the rotation detector.

Further preferably, generating the drive signal includes generating a signal to drive the motor such that deviation of the phase of rotation relative to the phase of the reference signal at steady state is less than 10% of the angular resolution of the rotation detector, and more preferably less than 5% of the angular resolution of the rotation detector.

There is additionally provided in accordance with a preferred embodiment of the present invention a method for controlling an electric motor, including:

generating a reference signal having a phase and frequency determined in accordance with a set of motion parameters input to the circuit;

receiving a feedback signal from a rotation detector coupled to the motor, the detector having a predetermined rotational resolution; and generating a drive signal by comparing the reference signal and the feedback signal, to drive the motor at a phase and speed of rotation determined by the frequency and phase of the reference signal, so that the phase of rotation of the motor is locked to the phase of the reference signal, such that when the frequency of the reference signal is changed to a new frequency thereof, the rotation of the motor changes to a new speed, determined by the new frequency, substantially without overshoot or undershoot.

Preferably, generating the drive signal includes generating a train of pulse-width modulated pulses, having a substantially higher pulse frequency than the feedback signal.

Further preferably, receiving the feedback signal includes receiving a periodic signal having a frequency and phase dependent on the rotation of the motor, and comparing the reference signal and the feedback signal includes generating a phase-frequency signal responsive to a phase deviation between the phase of the reference and feedback signals.

Preferably, generating the phase-frequency signal includes controlling a phase of the signal automatically responsive to a change in the motion parameters, so as to prevent the overshoot or undershoot.

Further preferably, controlling the phase includes modifying a phase responsive to a change in motor speed and/or motor shaft load and/or motor supply voltage.

Further preferably, controlling the phase includes controlling transitions among a plurality of states in an edge-controlled memory network.

There is additionally provided in accordance with another preferred embodiment of the present invention a method for controlling an electric motor, including:

generating a reference signal having a phase and frequency determined in accordance with a set of motion parameters input to the circuit;

receiving a feedback signal from a rotation detector coupled to the motor, the detector having a predetermined rotational resolution; and generating a drive signal by comparing the reference signal and the feedback signal, to drive the motor at a phase and speed of rotation determined by the frequency and phase of the reference signal, so that the phase of rotation of the motor is locked to the phase of the reference signal, such that the drive signal includes a series of pulses having a pulse repetition frequency substantially higher than the frequency of the feedback signal.

Preferably, generating the drive signal includes generating a series of pulse bursts, wherein the number of pulses in each burst is generally dependent on the phase deviation between the phase of the reference signal and the phase of rotation of the motor.

Preferably, generating the drive signal includes generating a pulse-width modulated signal.

There is also provided in accordance with an alternative preferred embodiment of the present invention a method for controlling an electric motor, including:

generating a clock signal having a substantially constant frequency;

generating a reference signal responsive to the clock signal, having a phase and frequency determined in accordance with a set of motion parameters input to the circuit, and varying the phase and frequency substantially continuously in response to a change in the motion parameters;

receiving a feedback signal from a rotation detector coupled to the motor; and generating a drive signal by comparing the reference signals and the feedback signal, to drive the motor at a phase and speed of rotation determined by the frequency and phase of the reference signals.

Preferably, varying the phase and frequency includes varying phase and frequency independent of the operation of a variable-frequency oscillator, and independent of the operation of a low pass filter.

Preferably, generating the reference signal includes performing one or more multiplication operations and one or more division operations on the clock signal.

Still further preferably, generating the clock signal includes generating two asynchronous clock signals, which are used in generating the drive signals.

The present invention will be more fully understood from the following detailed description of the preferred embodiments thereof, taken together with the drawings in which:

BRIEF DESCRIPTION OF THE DRAWINGS

FIG. 3A is a schematic illustration of a rotation detector, in accordance with a preferred embodiment of the present invention;

FIG. 3B is a schematic illustration of a rotation detector, in accordance with another preferred embodiment of the present invention;

DETAILED DESCRIPTION OF PREFERRED EMBODIMENTS

Figure 1:
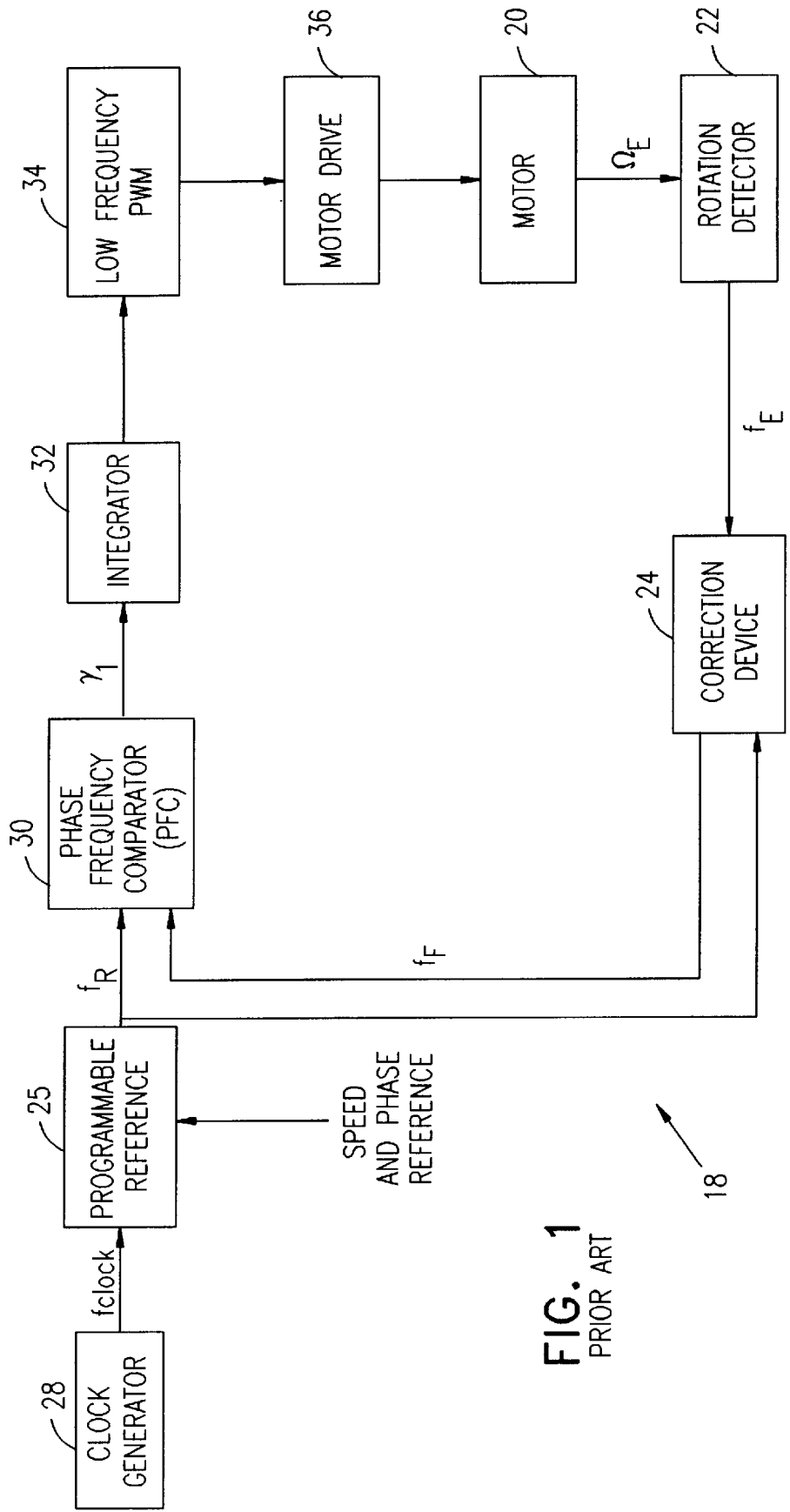
FIG. 1 is a schematic block diagram showing a prior art automatic controller for an electric motor.
Figure 2A:
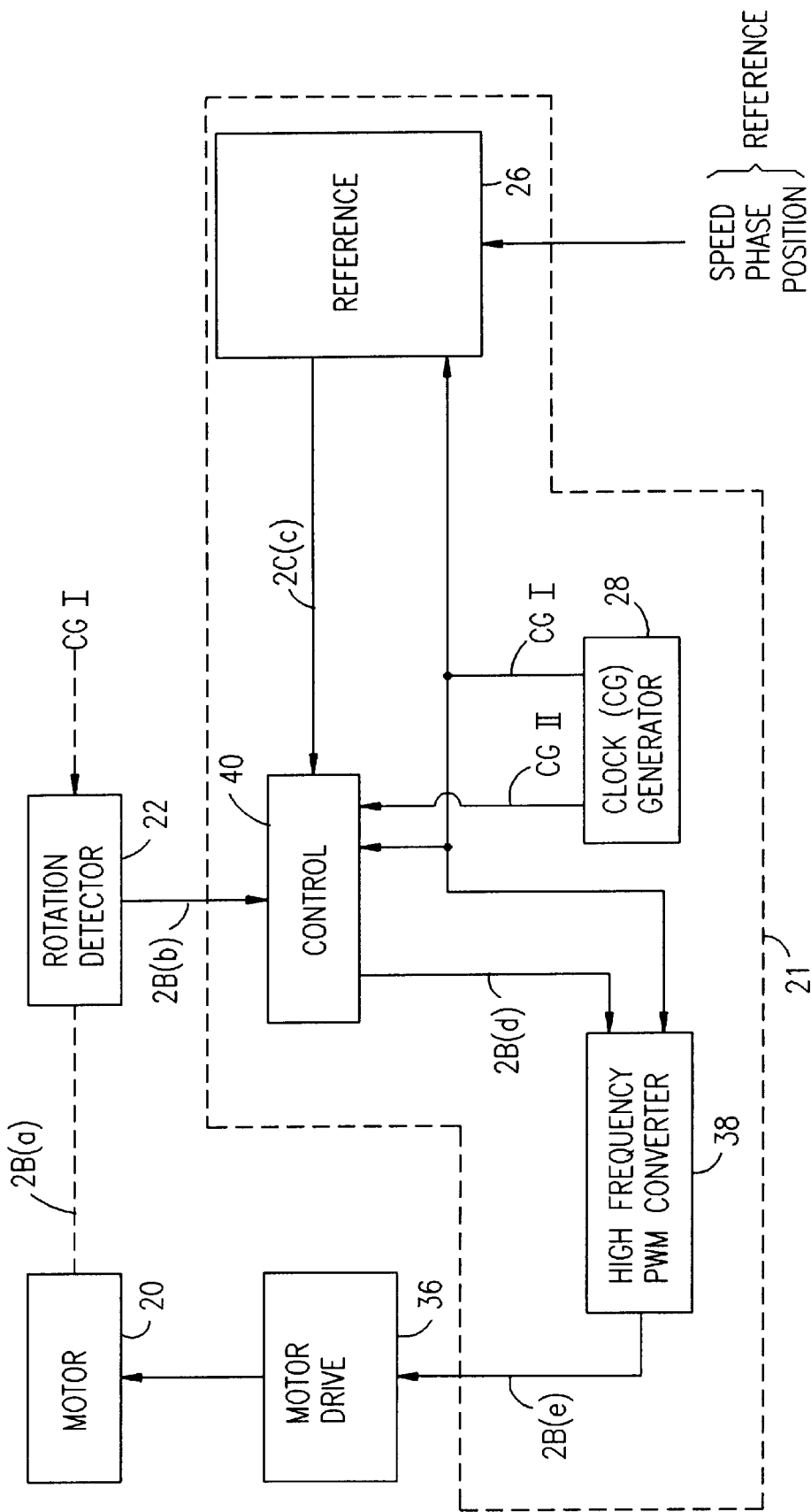
FIG. 2A is a schematic block diagram showing an automatic electric motor controller, in accordance with preferred embodiments of the present invention.

FIG. 2A is a schematic block diagram showing an electric motor 20 controlled by an automatic controller 21, in accordance with a preferred embodiment of the present invention. Motor 20 is preferably a DC servo motor, as is known in the art, although controller 21 may be easily adapted to drive motors of other types.

Controller 21 comprises a motor drive 36, for example, a MPM 3003, manufactured by Motorola, of Phoenix, Ariz., which generates a DC voltage to drive motor 20 in response to a high-frequency PWM signal received from a high-frequency PWM converter 38. A rotation detector 22 detects motion parameters of motor 20 and outputs a feedback signal in response thereto to a control circuit 40. A reference circuit 26 generates a reference signal, preferably in response to a set of externally preset motion parameters. The reference signal is also input to control circuit 40, which compares the reference signal to the feedback signal so as to generate a duty cycle-modulated control signal, which is input to PWM converter 38. The functions of converter 38, reference circuit 26 and control circuit 40 are preferably implemented using one or more hybrid ASIC arrays, for example, MC 33034 arrays manufactured by Motorola, of Phoenix, Ariz., but discrete logic components, as are known in the art, may also be used for this purpose. Clock signals CGI and CGII, generated by a clock generator 28, serve as clock bases for automatic controller 21.

Figure 2B:
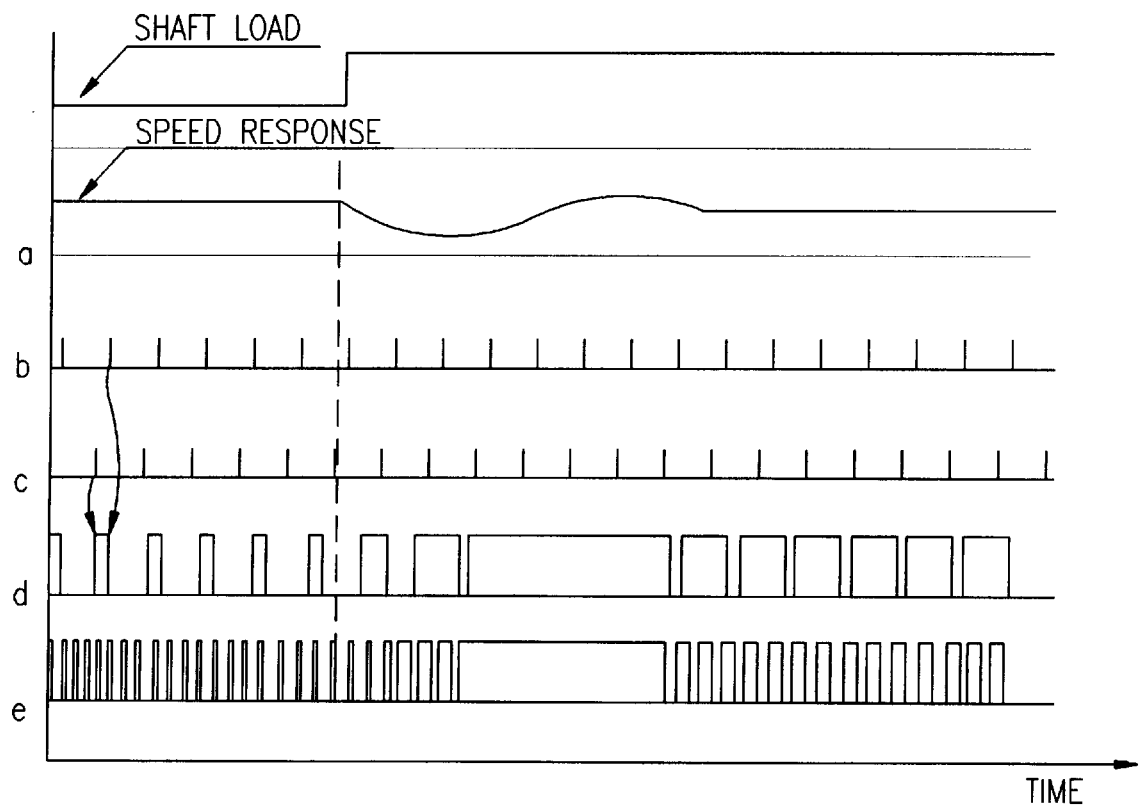
FIG. 2B is a schematic timing diagram showing a response of the automatic controller of FIG. 2B to a transient disturbance, in accordance with a preferred embodiment of the present invention.

FIG. 2B is a timing diagram showing signals received and/or generated by individual units of controller 21 in response to a decrease in the motor's rotational speed, resulting from an increase in the motor's shaft load. FIG. 2B will be used to describe, by way of example, the general operation of controller 21, in accordance with a preferred embodiment of the present invention. For the sake of simplicity, the traces shown in FIG. 2B (and in other timing diagrams described hereinbelow) will be referred to herein as 2B(i a), 2B(b), etc. [i.e., trace "a" of FIG. 2B is referred to as 2B(a)]. FIG. 2A is marked accordingly, to show the locations in the block diagram at which the traces shown in FIG. 2B occur. A similar method of notation is used in others of the schematic and timing diagrams described below.

Rotation detector 22 (preferred embodiments of which are shown in detail in FIGS. 3A and 3B and described with reference thereto), detects an actual, instantaneous speed of rotation 2B(a) of motor 20 and outputs a feedback signal 2B(b), comprising a pulse train of frequency and phase corresponding to the actual instantaneous speed of rotation 2B(a). Signal 2B(b) is input to control circuit 40 along with a reference signal 2B(c) generated by reference circuit 26 (further preferred embodiments of which are shown in detail in FIGS. 4A and 4B and described with reference thereto). Signal 2B(c) is generated in response to a set of externally-determined motion parameters input to controller 21, including speed and phase reference values and, optionally, position and/or grip/move (stop/start) reference values, as well.

Control circuit 40 (a preferred embodiment of which is shown in detail in FIGS. 6A and 6B and described with reference thereto) processes feedback signal 2B(b) and reference signal 2B(c) to generate a duty cycle-modulated signal 2B(d). This signal generally corresponds to the phase difference between the feedback and the reference signals. The duty cycle is seen to increase particularly in response to the phase lag induced when the shaft load is increased. The duty cycle-modulated signal is output to high-frequency pulse-width modulation (PWM) converter 38, which generates a high-frequency PWM drive signal 2B(e), which is input to motor drive 36. The high frequency of the PWM drive signal, relative to systems known in the art, smoothens the motor's response during transients, i.e., decreases motor speed and phase fluctuations, decreases the motor's response time, reduces motor current fluctuations and accordingly, reduces temperature build-up within the motor cage.

FIG. 3A is a schematic illustration showing rotation detector 22, based on an incremental encoder 58, in accordance with a preferred embodiment of the present invention. Encoder 58 may comprise, for example, an optical or a magnetic encoder, as are known in the art. Detector 22 comprises a rotation direction detector 60, which outputs a clockwise (CW)/counter-clockwise (CCW) signal. Encoder 58 outputs a pulse train having a frequency $f_{rot}$[Hz], related to the actual rotational speed $\Omega$[rpm] by:

$$f_{rot} = \frac{Z \cdot \Omega}{60} \quad [1]$$

wherein Z is the number of pulses output by the encoder in a complete 360° rotation of the motor shaft. Both the pulse train and the Cd/CCW signal are preferably output to control circuit 40. Alternatively, the output of detector 22 may be further modified by pulse addition or removal, to generate a signal including both, speed and direction information, and having a pulse frequency f defined by:

$$f = f_o \pm f_{rot} \quad [2]$$

wherein $f_o$ is signal 2B(c), output by reference circuit 26. Thus, detector 22 can provide both speed and direction outputs, while using a low-cost, off-the-shelf encoder.

FIG. 3B is a schematic illustration showing another preferred embodiment of rotation detector 22, based on a resolver 62. In this case, rotation detector 22 comprises a divider 70, which receives clock signal GCI and outputs a modified clock signal to an addressed divider 68. The addressed divider addresses two memories 66, each comprising a look-up table, one of $\sin(2\pi f_o t)$ and the other of $\cos(2\pi f_o t)$. Memories 66 are coupled to respective digital/analog converters 64, which are coupled in turn to two poles 61 of resolver 62. Such resolvers are known in the art. The third pole of the resolver is coupled to motor 20, and outputs frequency f defined in accordance with equation [2]. In this case, Z is the number of poles of resolver 62.

Figure 4A:
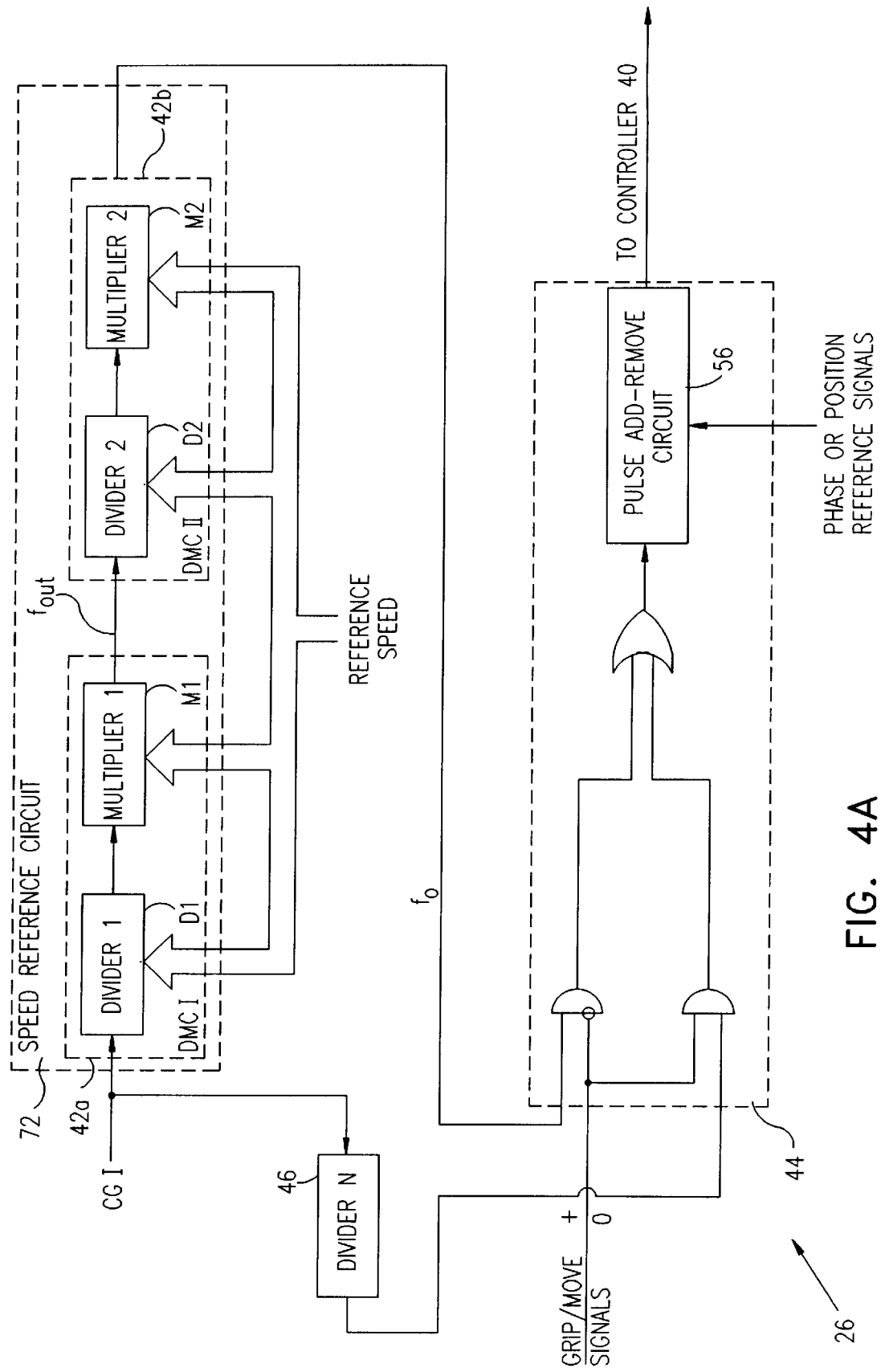
FIG. 4A is a schematic block diagram illustration of a reference circuit for use in the controller of FIG. 2A, in accordance with a preferred embodiment of the present invention.

FIG. 4A is a schematic illustration showing details of reference circuit 26, in accordance with a preferred embodiment of the present invention. Circuit 26 comprises a speed variation circuit 72, a divider 46 and a phase/position variation circuit 44. These circuits together receive the external speed, phase and position reference inputs, and control the reference signal accordingly.

Speed reference circuit 72 comprises programmable divider-multiplier cascades (DMC) 42a and 42b, which are used to modify the frequency of the reference signal. For the sake of simplicity, the present embodiment, shown in FIG. 4A comprises two programmable DMCs. However, it will be understood that more or fewer such cascades may be used.

In an exemplary embodiment of the present invention, cascades 42a and 42b are characterized by respective multiplier coefficients $M_1 = M_2 = 100$ and divider coefficients $D_1 = 99$ and $D_2 = 101$ and a transformation function given by:

$$f_o = f_{in} \cdot \frac{M_1 \cdot M_2}{D_1 \cdot D_2} \quad [3]$$

The input frequency $f_{in}$ is in this case equal to the frequency of the clock, CGI. Circuit 72 transforms the input speed reference $f_{in}$ so that the minimal achievable frequency variation $\Delta f_{min}$, which is defined as the minimal difference between a transformed speed reference signal having frequency $f_o$ and the initial speed reference signal, is given by:

$$\Delta f_{min} = f_o - f_{in} = f_{in} \cdot \left(\frac{M_1 \cdot M_2}{D_1 \cdot D_2} - 1\right) = 0.0001 f_{in} \quad [4]$$

Such "fine-tuning" capabilities enable a smooth variation of the speed reference value during transients, resulting in quick convergence, without substantial overshoots. Moreover, the design of circuit 72 enhances the controllable speed range of motor 20, mainly allowing accurate control of low speed values ranging from practically zero to a few tens of rpm.

The transformed speed reference signal is input to a pulse add-remove circuit 56, which modifies the signal responsive to input phase and/or position reference signals. The signal is input to circuit 56 as long as an input "grip/move" signal is in the move state, whereby motor 20 will be continuously rotating. In the grip (motor stop) state, divider 46a inputs a low-frequency idle signal to circuit 56, which allows continual control of the motor even when its continuous rotation is interrupted. The reference signal output by reference circuit 26 is then input to control circuit 40, which is described in greater detail below.

Figure 4B:
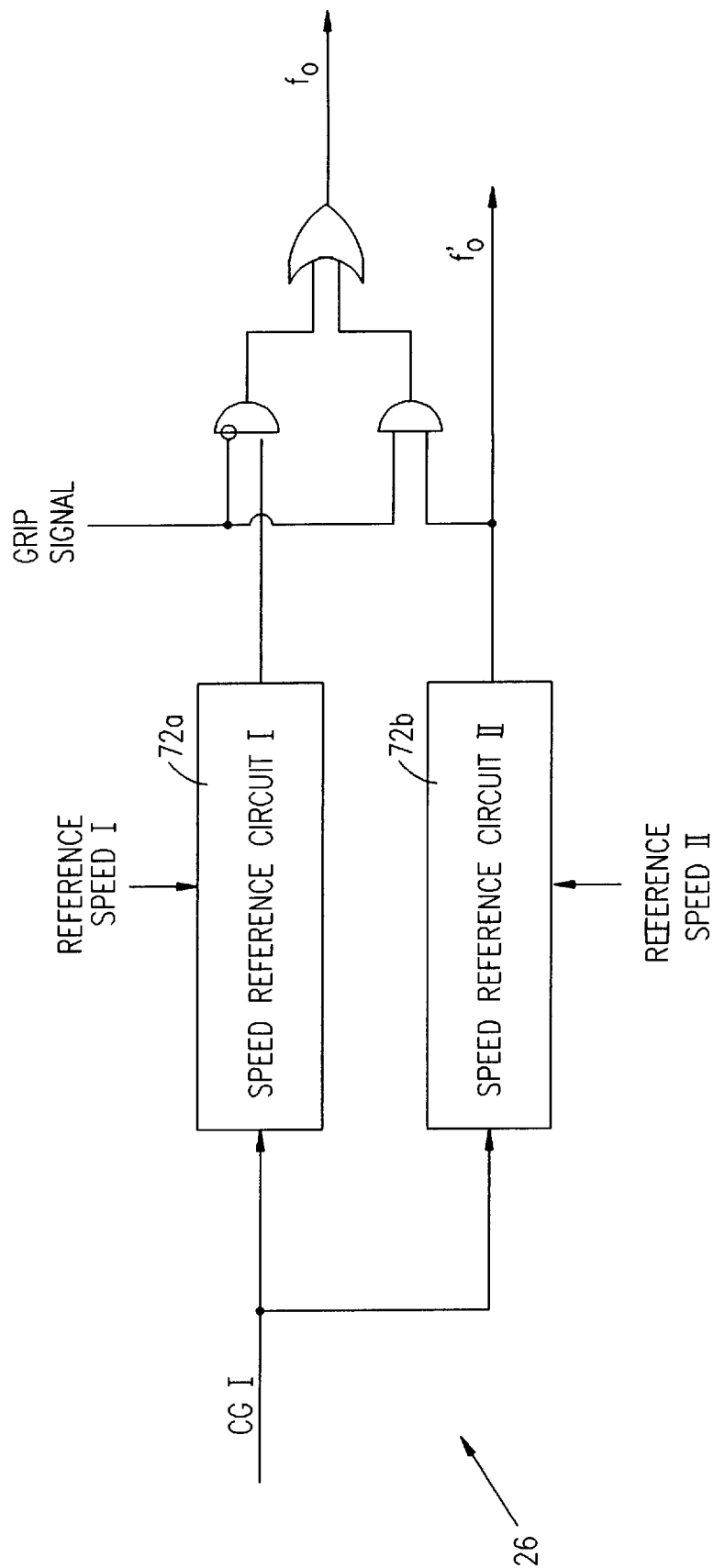
FIG. 4B is a schematic block diagram illustration of a reference circuit for use in the controller of FIG. 2A, in accordance with another preferred embodiment of the present invention.

FIG. 4B is a schematic illustration of reference circuit 26 in accordance with another preferred embodiment of the present invention, designed particularly for high-precision motion control at low speeds and expanded dynamic range of motors speeds, as mentioned above. For this purpose, circuit 26 comprises two different speed variation circuits 72a and 72b, arranged in parallel. Each circuit is characterized by a respective speed reference input and respective DMC coefficients and transformation function. Two different, transformed speed reference signals are generated, so as to achieve an arbitrarily small difference therebetween.

For example, speed variation circuit 72a transforms the initial reference speed signal $f_{in}$ according to:

$$f_o = f_{in} \cdot \frac{(M_1 - 2)(M_2 - 2)}{(D_1 - 2)(D_2 - 2)} \quad [5]$$

and speed variation circuit 72b transforms the initial reference speed signal according to:

$$f'_o = f_{in} \cdot \frac{(M_1 - 1)(M_2 - 1)}{(D_1 - 1)(D_2 - 1)} \quad [6]$$

In an exemplary embodiment of the present invention, characterized by respective multiplier coefficients $M_1=M_2=100$ and divider coefficients $D_1=99$ and $D_2=101$ and the respective transformation functions [5] and [6], a minimal frequency difference Δfmin according to:

$$\Delta f_{min} = f_o - f'_o = 2 \cdot e^{-6} \cdot f_{in} \quad [7]$$

may be achieved.

Figure 5A:
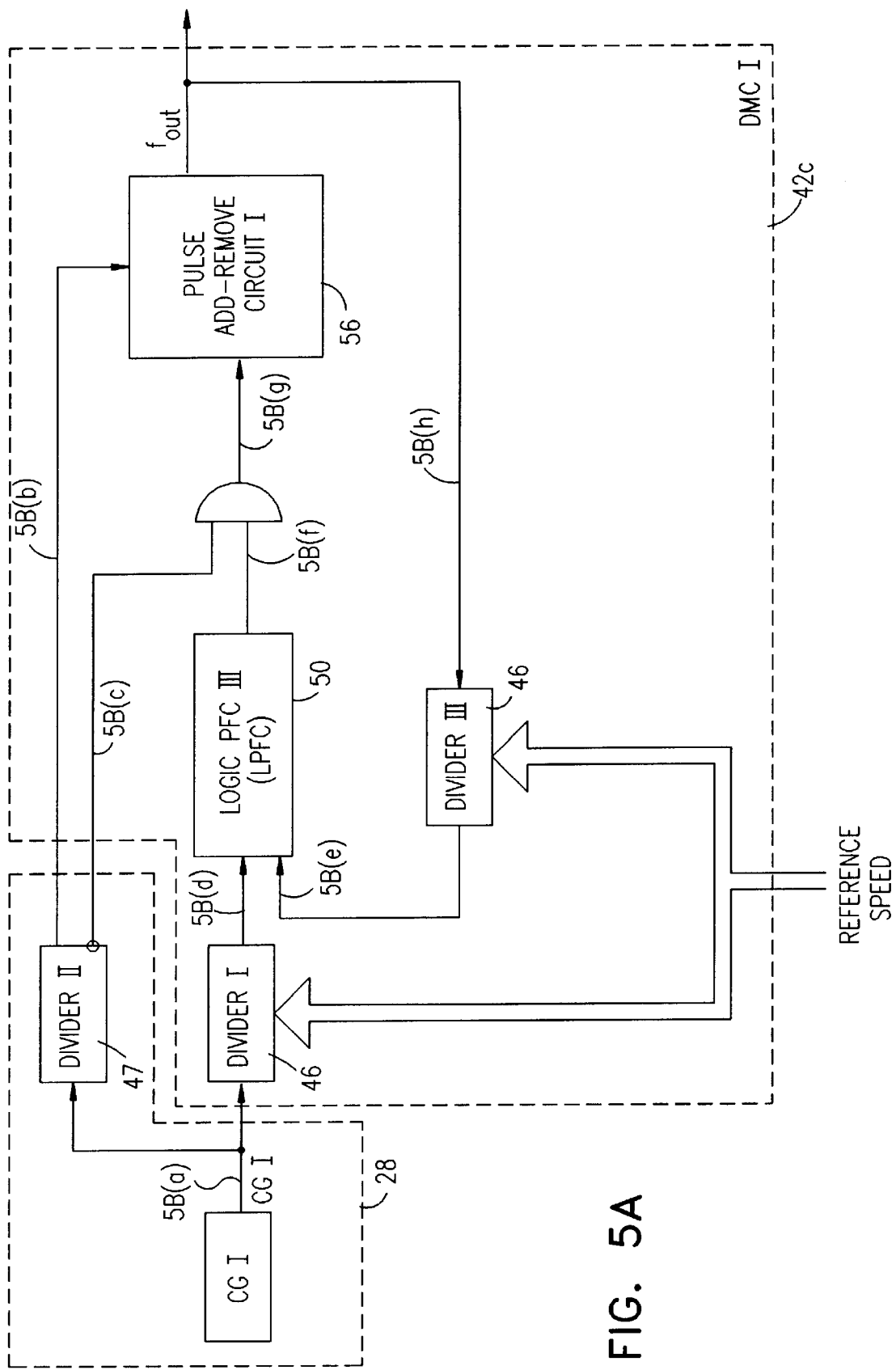
FIG. 5A is a schematic block diagram showing details of a speed reference circuit, in accordance with a preferred embodiment of the present invention.
Figure 5B:
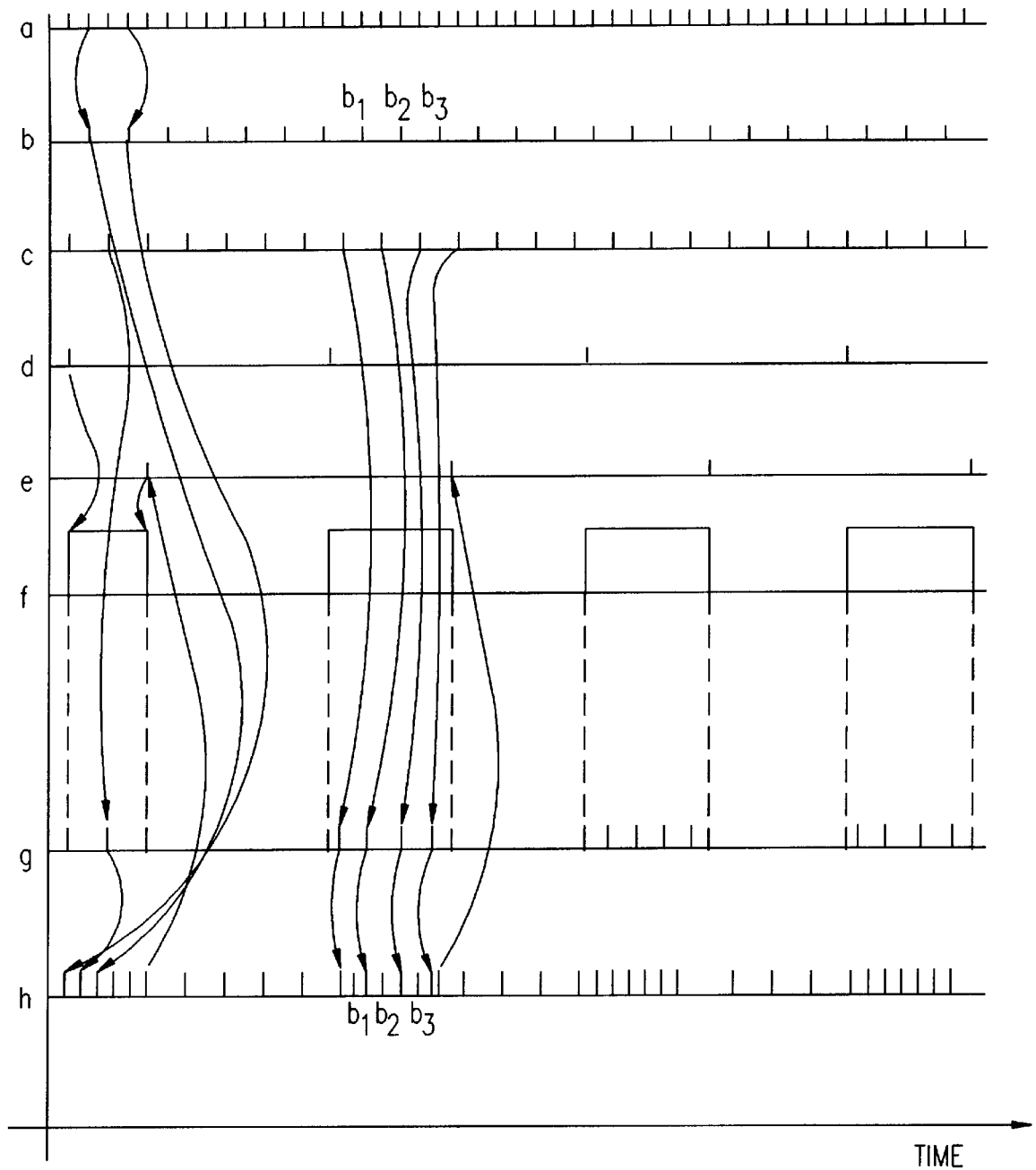
FIG. 5B is a timing diagram showing signals in the circuit of FIG. 5A, in accordance with a preferred embodiment of the present invention.

Reference is now made to FIGS. 5A and 5B. FIG. 5A is a block diagram showing details of clock generator 28 and a DMC 42c, in accordance with another preferred embodiment of the present invention, and FIG. 5B is a timing diagram thereof. This preferred embodiment is designed to further expand the motor speed dynamic range and enable the achievement of arbitrarily small phase and frequency differences between a transformed speed reference signal and an initial input clock value. Clock generator 28 supplies a clock signal CGI, shown in trace 5B(a), as well as complementary, divided clock signals shown by traces 5B(b) and (c), generated by a divider 47. DMC 42c comprises a feedback loop in which a logic phase frequency converter (LPFC) 50, as is known in the art (e.g., a National Semiconductor CD 4046BM or equivalent device), produces duty cycle-modulated square wave pulses 5B(f) using divided clock signal 5B(d) as a reference signal and 5B(e) as a feedback signal. Dividers 46 produce reduced-frequency clock signal 5B(d) and feedback signal 5B(e), based on division coefficients set in accordance with an externally-input reference speed. An AND gate generates a pulse train 5B(g), comprising divided clock signal 5B(c), within an envelope defined by signal 5B(f). A pulse add-remove circuit 56 adds pulse train signals 5B(g) and 5B(b) together to generate an output pulse train 5B(h), having a variable frequency $f_{out}$ comprising high-frequency [5(b)+5(c)] and low-frequency 5(b) sections, which alternate in correspondence to duty cycle signal 5B(f). Pulse train 5B(h) is input, after division, to LPFC 50 to provide feedback signal 5B(e).

Figure 6A:
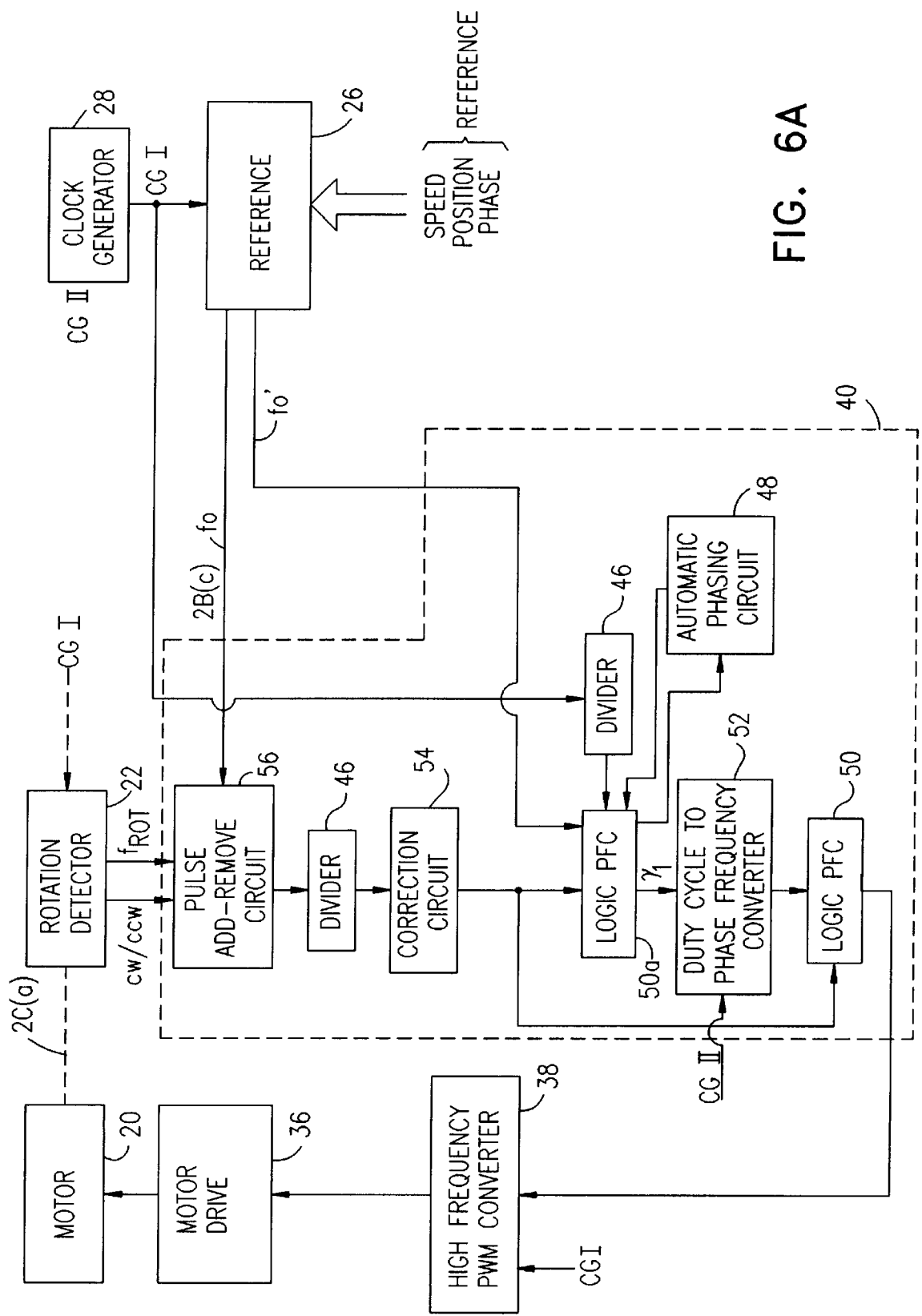
FIG. 6A is a schematic block diagram showing details of a control circuit used in the automatic controller of FIG. 2A, in accordance with a preferred embodiment of the present invention.

Reference is now made to FIGS. 6A–6E, 7A, and 7B, which illustrate the design and operation of control circuit 40, in accordance with a preferred embodiment of the present invention. The control circuit provides improved response to transient changes in the motor direction and speed of rotation, substantially without overshoot or undershoot. It also substantially eliminates the "dead zone" effect described above, whereby phase deviations between the reference signal and the actual motor rotation cause inaccuracies in the motor's speed and position. These aspects of the performance of circuit 40 are provided by a correction circuit 54, an automatic phasing circuit 48, and a duty cycle to phase-frequency converter 52, which operate in conjunction with LPFCs 50a and 50b, as shown in FIG. 6A. These elements are described in greater detail hereinbelow.

Figure 6B:
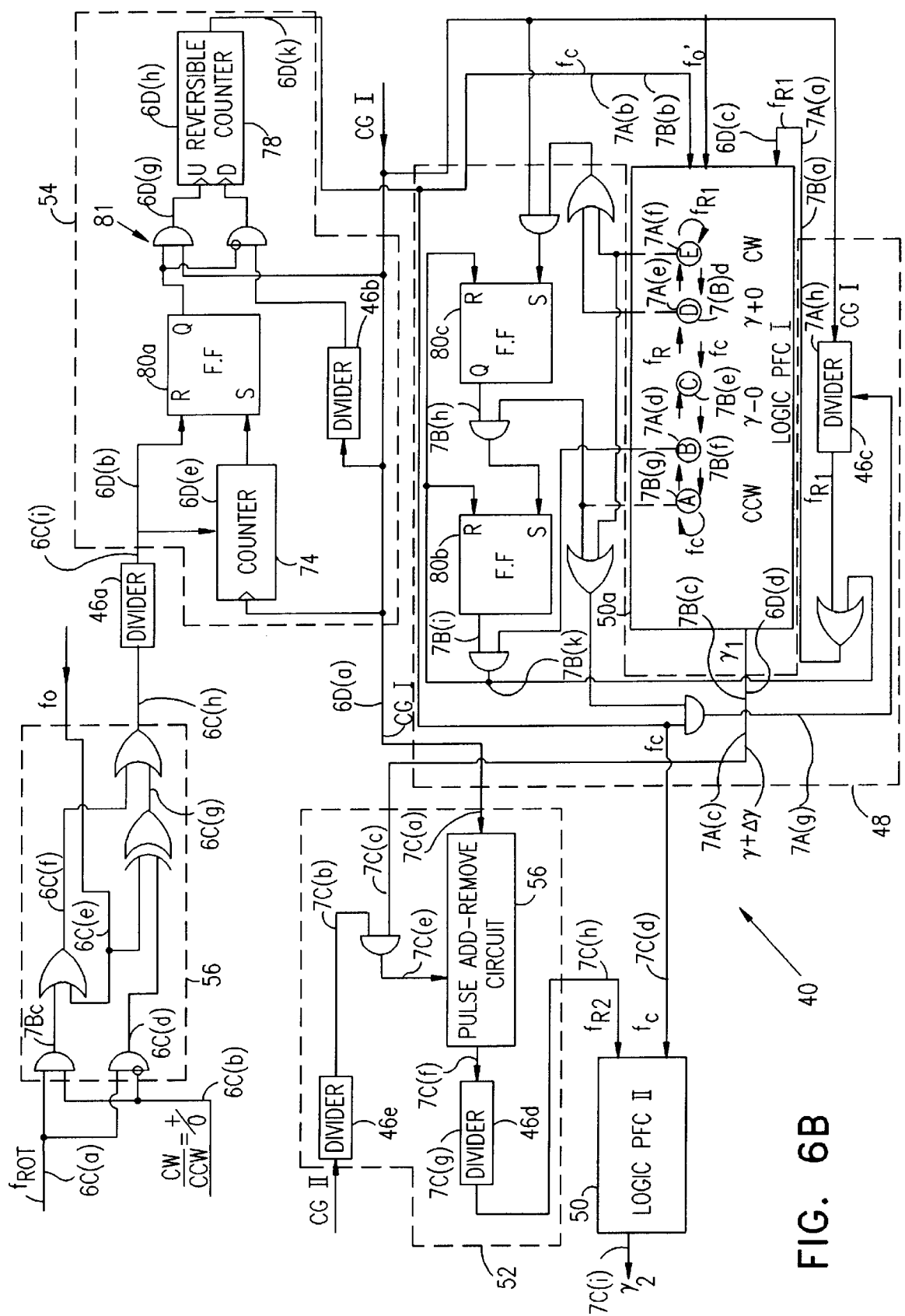
FIG. 6B is a schematic diagram showing further details of the control circuit of FIG. 6A, in accordance with a preferred embodiment of the present invention.
Figure 6C:
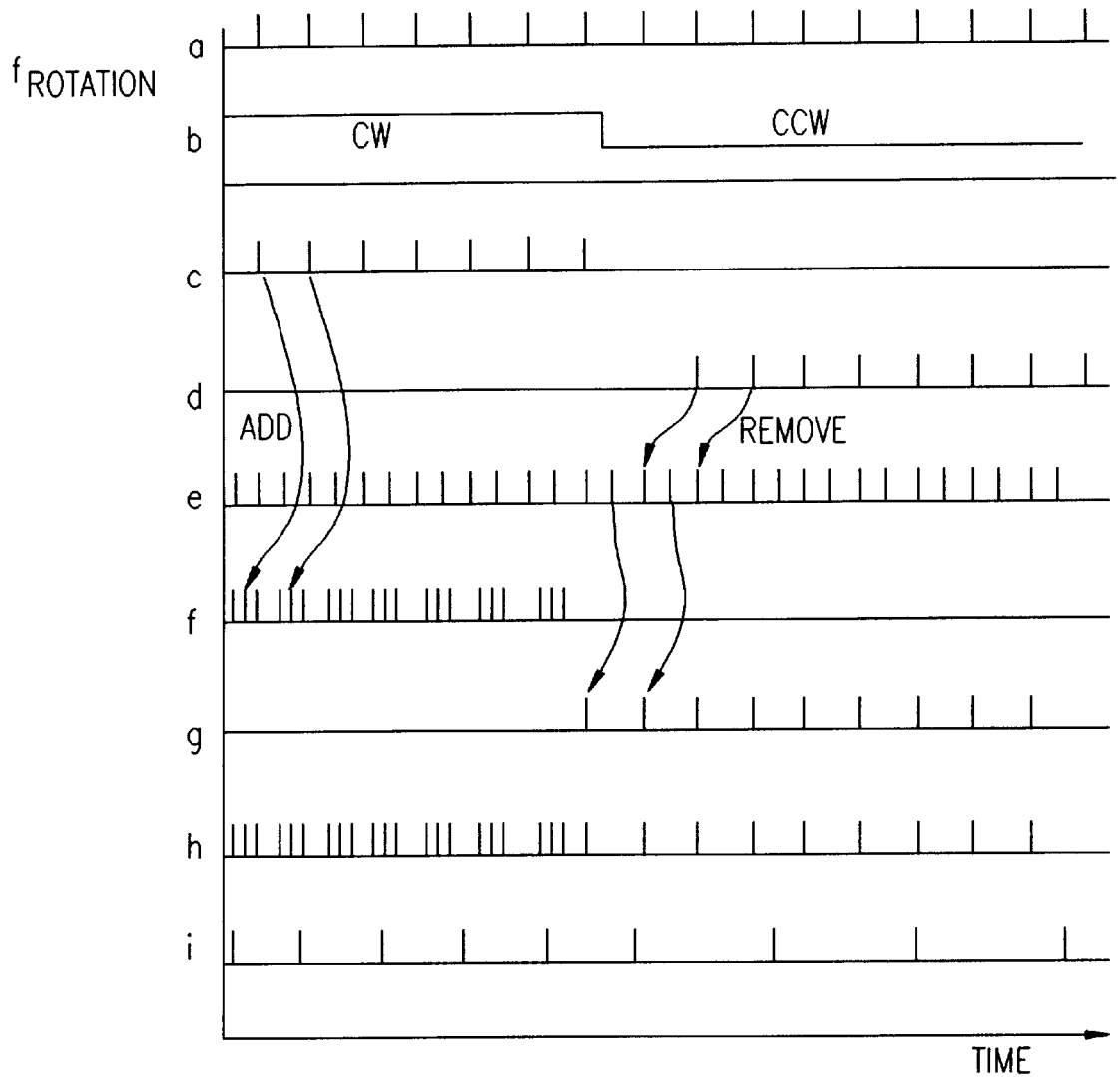
FIG. 6C is a timing diagram showing a response of the circuit of FIG. 6B to a change in rotation direction, in accordance with a preferred embodiment of the present invention.
Figure 6D:
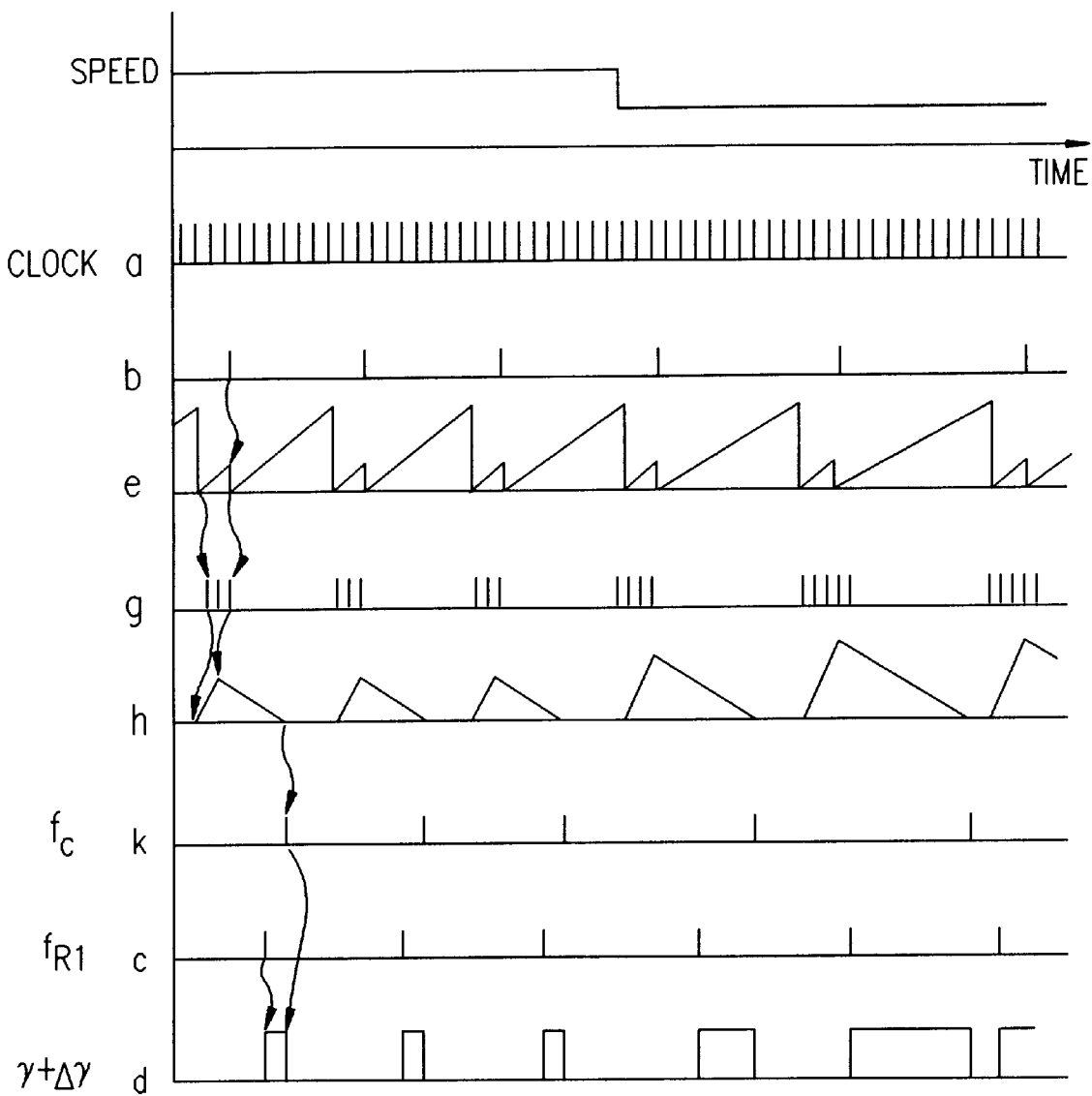
FIG. 6D is a timing diagram showing a response of the circuit of FIG. 6B to a speed change, in accordance with a preferred embodiment of the present invention.

FIG. 6A is an expanded block diagram showing details of control circuit 40, based on the general block diagram shown in FIG. 2A. FIG. 6B is a detailed logic diagram of circuit 40, as shown in FIG. 6A. FIGS. 6C and 6D, along with FIGS. 7A and 7B, are timing diagrams, depicting the operation of the control circuit in response to motion transients, i.e., acceleration/deceleration and change of rotational direction of motor 20. FIGS. 6A through 7B will be used to describe, by way of example, the general operation of circuit 40.

FIG. 6C illustrates the operation of pulse add-remove circuit 56 in response to a change in the direction of motor rotation. Rotation detector 22 outputs a pulse train 6C(a) having a frequency $f_{rot}$, related to rotational speed of motor 20 by equation [1], and an additional CW/CCW signal 6C(b) depicting the direction of rotation of motor 20, as described above. Both signals are input to pulse add-remove circuit 56 along with reference signal 2B(c) [corresponding to trace 6C(e)] having a frequency fo. These signals are combined as illustrated in FIGS. 6B and 6C, so that pulse trains 6C(a) and 6C(e) are added together when trace 6C(b) indicates that motor 20 is turning clockwise (CW), and are subtracted when the motor is turning counterclockwise (CCW). The combined signals thus generate a pulse train signal 6C(h), which includes both speed and direction of rotation information and having a frequency f given by equation [2] above, such that the in the CW direction f is given by:

$$f_{CW} = f_o + f_{rot} \quad [8a]$$

and in the CCW direction by:

$$f_{CCW} = f_o - f_{rot} \quad [8b]$$

Signal 6C(h) is further transformed by a divider 46a into a lower-frequency pulse train 6C(i), which is input to a correction circuit 54.

Optionally, in accordance with an alternative preferred embodiment of the present invention shown in FIG. 3B above and described with reference thereto, rotation detector 22 directly outputs signal 6C(h).

FIG. 6D illustrates the response of correction circuit 54 to a step decrease in rotational speed. The correction circuit receives input 6D(b) from pulse add-remove circuit 56, via a divider 46a, together with clock signal CGI, shown as trace 6D(a). The output of correction circuit, trace 6D(k), is input as a feedback pulse train signal having a frequency fc to LPFC 50a and to automatic phasing circuit 48. Circuit 48 generates an adjusted reference signal 6D(c), having a frequency $f_{R1}$, which is similarly input to LPFC 50a along with a reference signal $f_o'$. The LPFC then generates a corrected, duty cycle-modulated signal 6D(*d*), which is input to converter 52. The duty cycle γ1 of signal 6D(*d*) is seen to increase in response to the speed change, so as to cause the motor to return to the speed set by reference circuit 26.

The operation of correction circuit 54 is further illustrated by FIGS. 6B and 6D. Circuit 54 comprises a counter 74, which receives clock 6D(*a*) and input 6D(*b*) and generates a count signal 6D(*e*). This signal is input to flip-flop 80a, which inputs a signal to logic 81 along with a modified clock signal provided by a divider 46b. Logic 81 generates up- and down-count pulse trains. These pulse trains are received by a reversible counter 78 [whose internal operation is illustrated by trace 6D(*h*)], which generates the feedback signal shown in trace 6D(*k*).

Figure 6E:
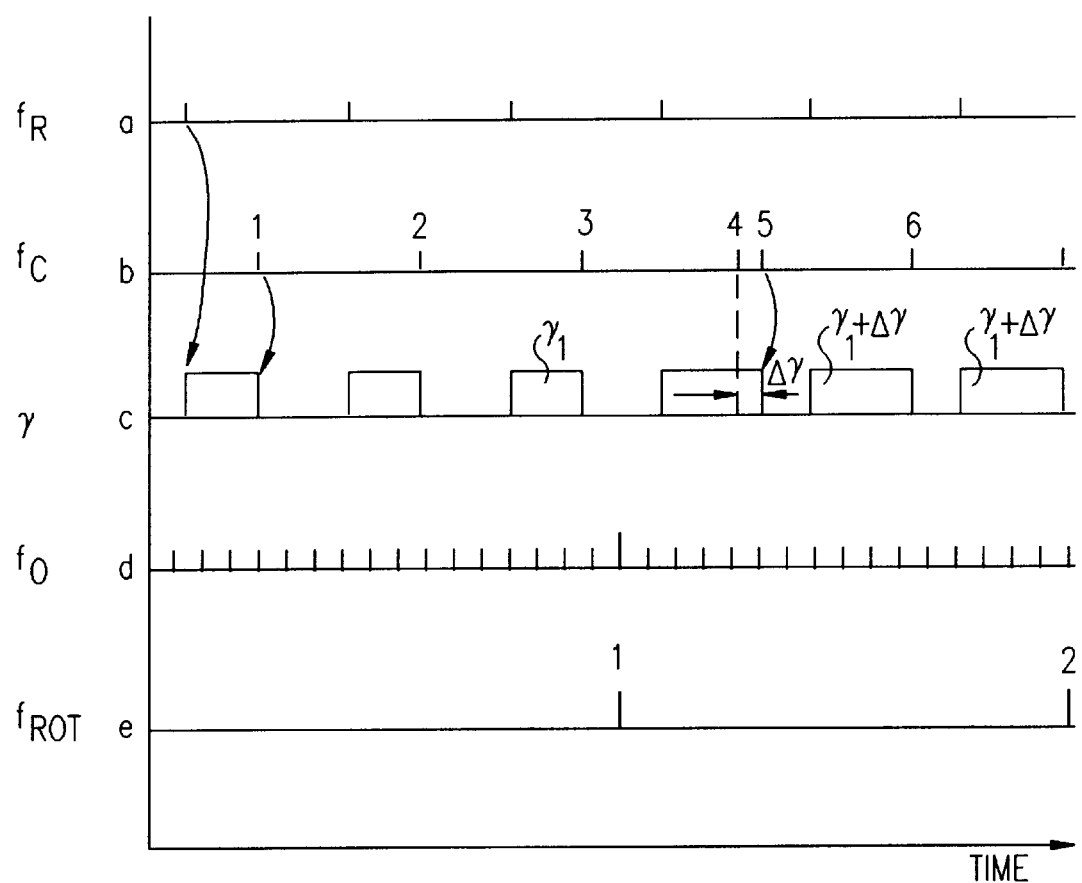
FIG. 6E is a timing diagram illustrating operation of the circuit of FIGS. 6A and 6B at low motor speed, in accordance with a preferred embodiment of the present invention.
Figure 7A:
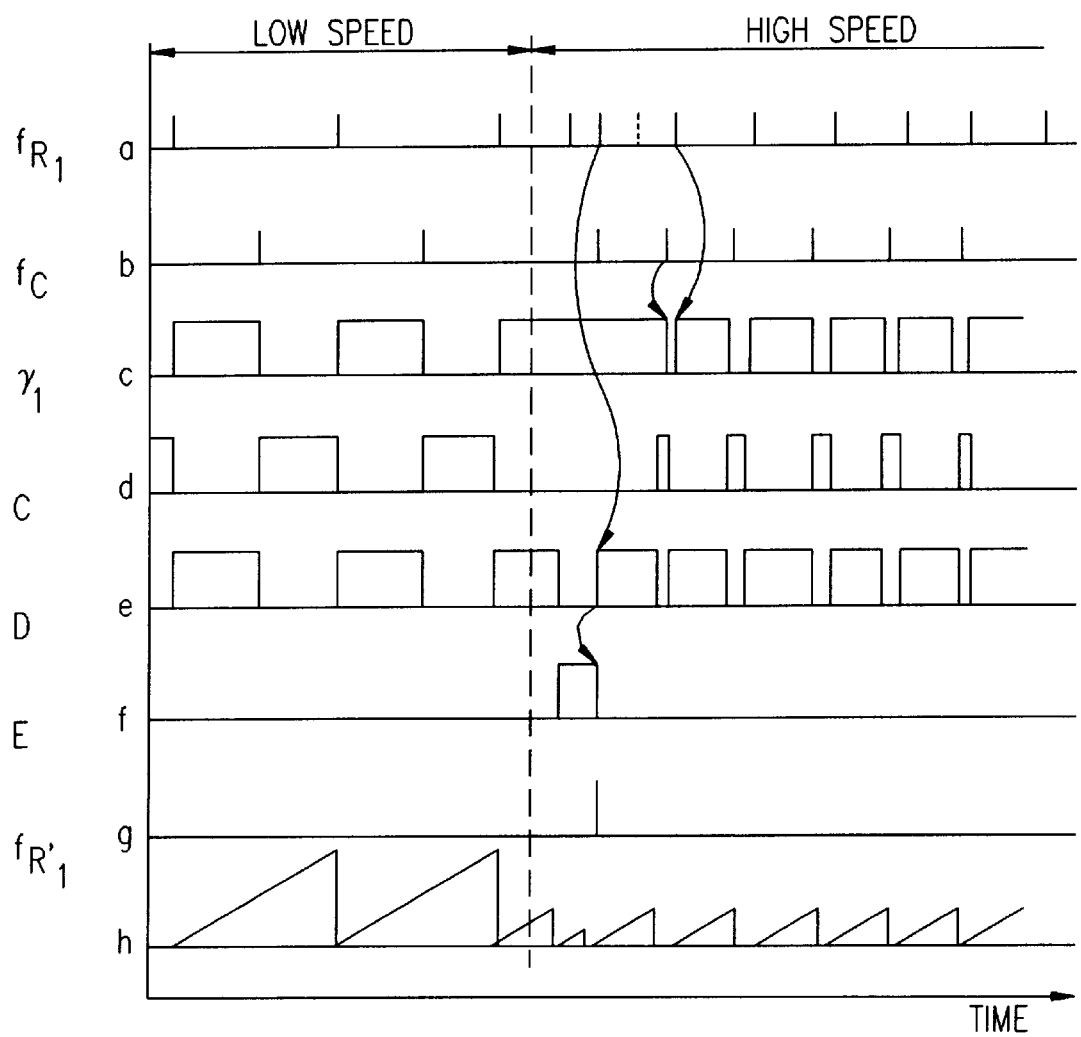
FIG. 7A is a timing diagram showing a response of the circuit of FIG. 6B to an acceleration, in accordance with a preferred embodiment of the present invention.
Figure 7B:
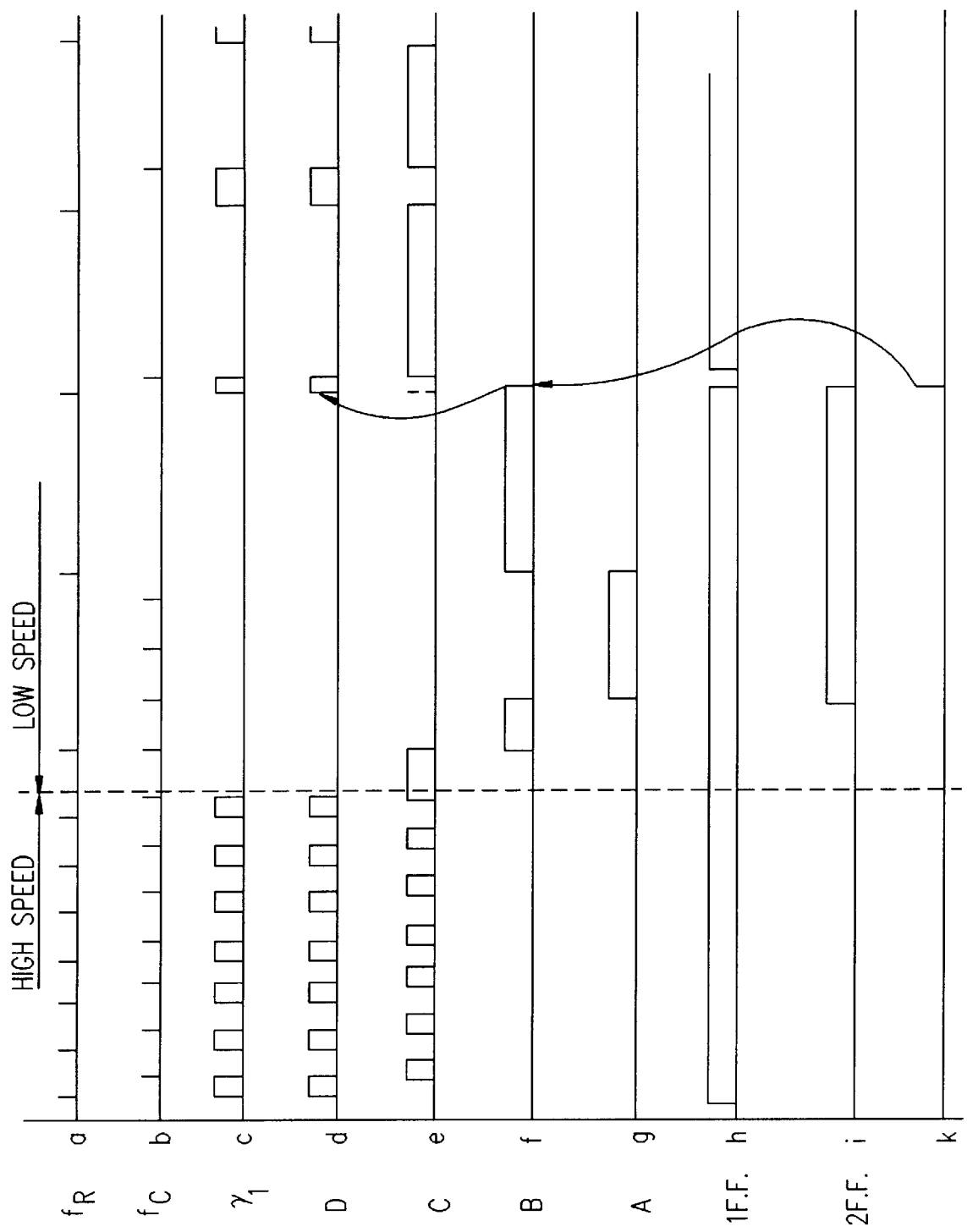
FIG. 7B is a timing diagram showing a response of the circuit of FIG. 6B to deceleration, in accordance with a preferred embodiment of the present invention.

FIG. 6E illustrates the operation of divider (counter) 46a, whose presence between add-remove circuit 56 and correction circuit 54 enables continuous control of the operation of motor 20 at low motor speeds. Preferably, this design enables continuous control of the motor operation when the motor rotates at speeds below 10 rpm, most preferably below 0.1 rpm, or even during interruption of the continuous rotation of the motor, such as during a change in the motor's direction of rotation. Trace 6E(*e*) depicts a pulse train generated by the rotation detector having a frequency frot (corresponding to the motor's rotational speed) substantially lower than the frequency fo of the reference signal illustrated in trace 6E(*d*). Pulse add-remove circuit 56 combines the two signals, as described above with reference to FIG. 6C, and inputs the combined signal to counter 46a to generate pulse train 6E(*b*) having a frequency $f_c$ lower than the frequency of the signal input to counter 46a, as described above with reference to traces 6C(*h*) and 6C(*i*) in FIG. 6C.

Counter 46a outputs a pulse train 6E(*b*), which is based on pulse train 6E(*d*) alone in the absence of pulses from pulse train 6E(*e*), or on a combination of pulse trains 6E(*d*) and 6E(*e*) when the latter are present. Occurrence of pulse (e)1 shifts pulse (b)4 to (b)5, and consequently, the duty cycle Δ1 of signal 6E(*c*) is seen to increase by an increment Δγ in response to the change in frequency $f_c$ of pulse train 6F(*b*), so that signal 6E(*c*) has a duty cycle γ₁+Δγ till the occurrence of pulse (e)2. In the absence of counter 46a the controller would have functioned intermittently in response to changes in the frequencies of either signal 6E(*d*) or 6E(*e*), disabling control during states characterized by $0 \leq f_{rot} << f_o$.

FIGS. 7A and 7B illustrate the operation of LPFC 50a under fast transient conditions, in which reference circuit 26 is instructed, respectively, to increase or decrease the speed of motor 20. LPFC 50a is an edge-controlled digital memory network having five states: two saturated edge states "A" and "E", two working states "B" and "D" and a zero state "C". The transitions among the states are responsive to the instantaneous phase deviation and are controlled by automatic phasing circuit 48 and correction circuit 54, by means of the feedback signal of frequency $f_c$, shown by traces 7A(*b*) and 7B(*b*), and the corrected reference signal, of frequency $f_{R1}$ shown by traces 7A(*a*) and 7B(*a*). The generation of these signals was generally described above with reference to FIG. 6D.

For the case of a desired increase in the motor speed shown by FIG. 7A, LPFC 50a begins in state C, wherein signals 7A(*d*) and 7A(*e*) are output to automatic phasing circuit 48 (as shown in detail in FIG. 6B). Increasing the reference speed of reference circuit 26 causes a corresponding increase in the corrected reference frequency $f_{R1}$ of input 7A(*a*) to the LPFC. This increase drives the LPFC to state D and thence to state E, whereby a saturation signal pulse 7A(*f*) is output to circuit 48. The saturation pulse causes circuit 48 to generate a reset pulse, shown by trace 7A(*g*). This pulse is added into the corrected reference trace 7A(*a*), as shown in the figure, as the result of resetting divider 46c, whose function is illustrated by trace 7A(*h*). LPFC 50a is consequently driven back to state D and then to state C. Trace 7A(*c*) shows the resultant increase in the duty cycle γ₁ of the output signal from LPFC 50a. It will be observed that the feedback frequency $f_c$ of trace 7A(*b*), corresponding to the speed of motor 20, tracks the corrected reference frequency smoothly, substantially without overshoot.

FIG. 7B illustrates the operation of L,PFC 50a and phasing circuit 48 when the motor speed is to be rapidly decreased. In this case, a step decrease in frequency $f_{R1}$ of input 7B(*a*) drives the LPFC from state C to state B to state A, wherein the reset pulse shown in trace 7B(*k*) is generated. Pulse 7B(*k*) transfers the LPFC from state B to state D, illustrated by trace 7B(*d*), resulting in an immediate generation of duty cycle signal γ₁.

Traces 7B(*h*) and 7B(*i*) illustrate the effect of flip-flops 80b and 80c of phasing circuit 48, in generating the reset pulse. Following the reset pulse, LPFC 50 returns to state D, as mentioned above, in this case with a reduction in the duty cycle γ₁. It will be observed in this case, as well, that the motor speed decreases in response to the reduction in the reference speed, substantially without undershoot. It will be appreciated that the operation of the automatic phasing circuit, exemplified hereinabove with respect to fast speed transients induced by a change in the reference parameters, will be similar in response to any changes in the motor's operational parameters, for example, changes in the motor's speed and/or phase induced by a change in a load on the motor, a transient change in a supply voltage applied to the motor or a gear backlash.

Figure 7C:
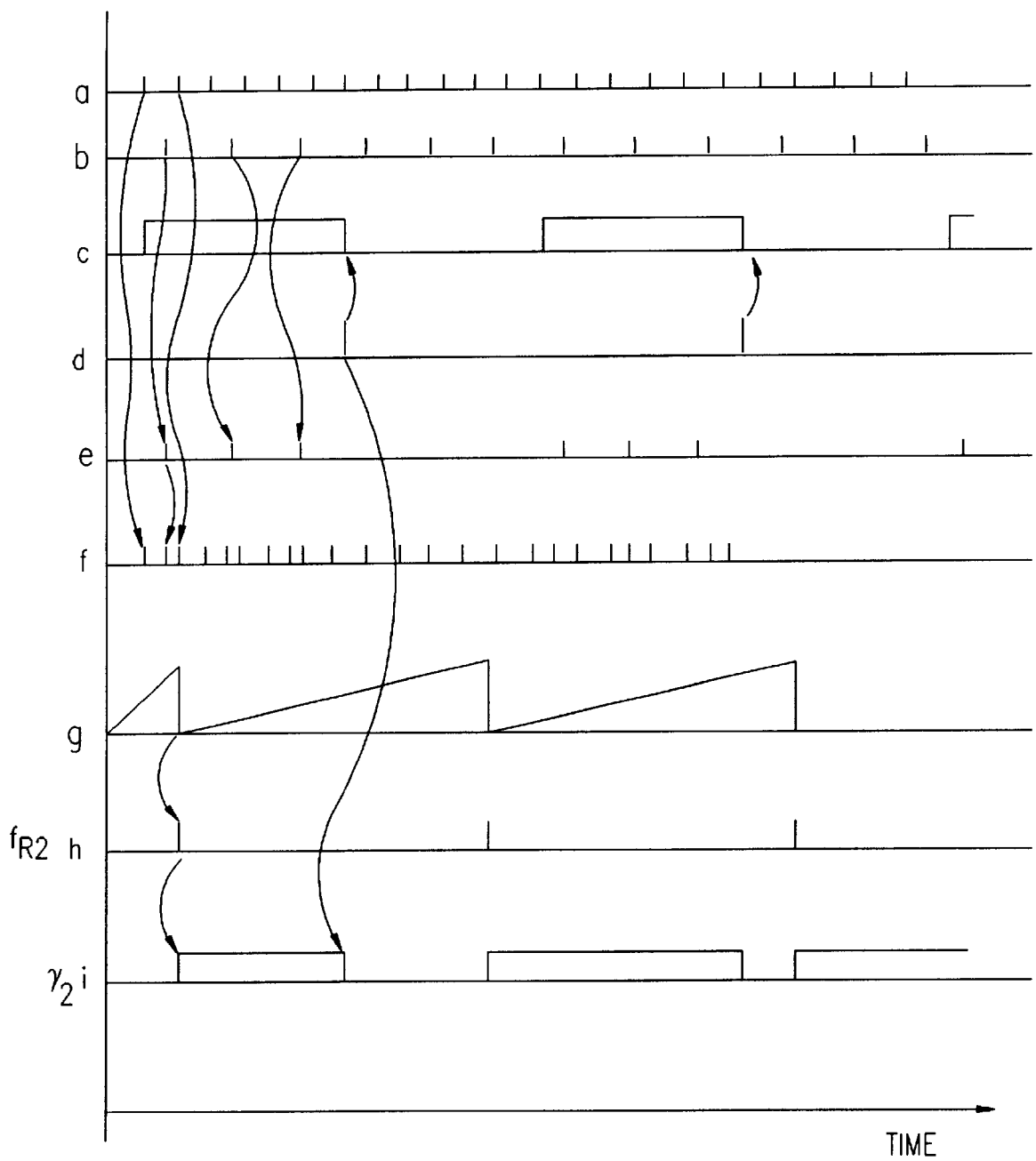
FIG. 7C is a timing diagram illustrating the operation of a duty cycle to phase-frequency converter in the circuit of FIG. 6B, in accordance with a preferred embodiment of the present invention.

FIG. 7C is a timing diagram schematically illustrating the operation of duty cycle to phase-frequency converter 52, in accordance with a preferred embodiment of the present invention. The duty cycle-modulated signal output by LPFC 50a, exemplified by trace 6D(*d*) (for the case of a step change in the rotational speed), and traces 7A(*c*) and 7B(*c*) (for speed transients—acceleration/deceleration) is output to converter 52. Converter 52 receives duty cycle modulated signal γ₁, illustrated by trace 7C(*c*), along with clock signal CGI, shown in trace 7C(*a*), and another asynchronous clock signal CGII, which is divided by divider 46e to generate pulse train 7C(*b*). An AND gate generates pulse train 7C(*e*), which comprises divided clock signal 7C(*b*) modulated by an envelope defined by trace 7C(?). A pulse add-remove circuit 56 adds signals 7C(*e*) and 7C(*a*) to generate pulse train 7C(*f*). This signal is integrated by a divider 46d, as illustrated by trace 7C(*g*), to generate a pulse train 7C(*h*) having a frequency $f_{R2}$. Pulse train 7C(*h*) is input as a reference signal to LPFC 50b, along with a feedback signal having a frequency $f_c$ [shown in traces 6D(*k*), 7A(*b*), 7B(*b*) and 7C(*d*)], to generate a modified duty cycle-modulated output, having a duty cycle γ₂ [shown in trace 7C(*i*)], to high-frequency PWM converter 38.

Using the two asynchronous clocks in converter 52 to generate the driving signal input to the motor drive introduces "first-order astatism" in the drive, which, in steady state, substantially eliminates the discretization and "dead zone" errors of conventional discretization/integration methods known in the art.

Optionally, the modified output of LPFC 50b may be used as an input to an additional, similar processing stage, thus achieving second, third and higher order astatism. Each additional such stage will generally further enhance the accuracy of the controller.

Figure 8A:
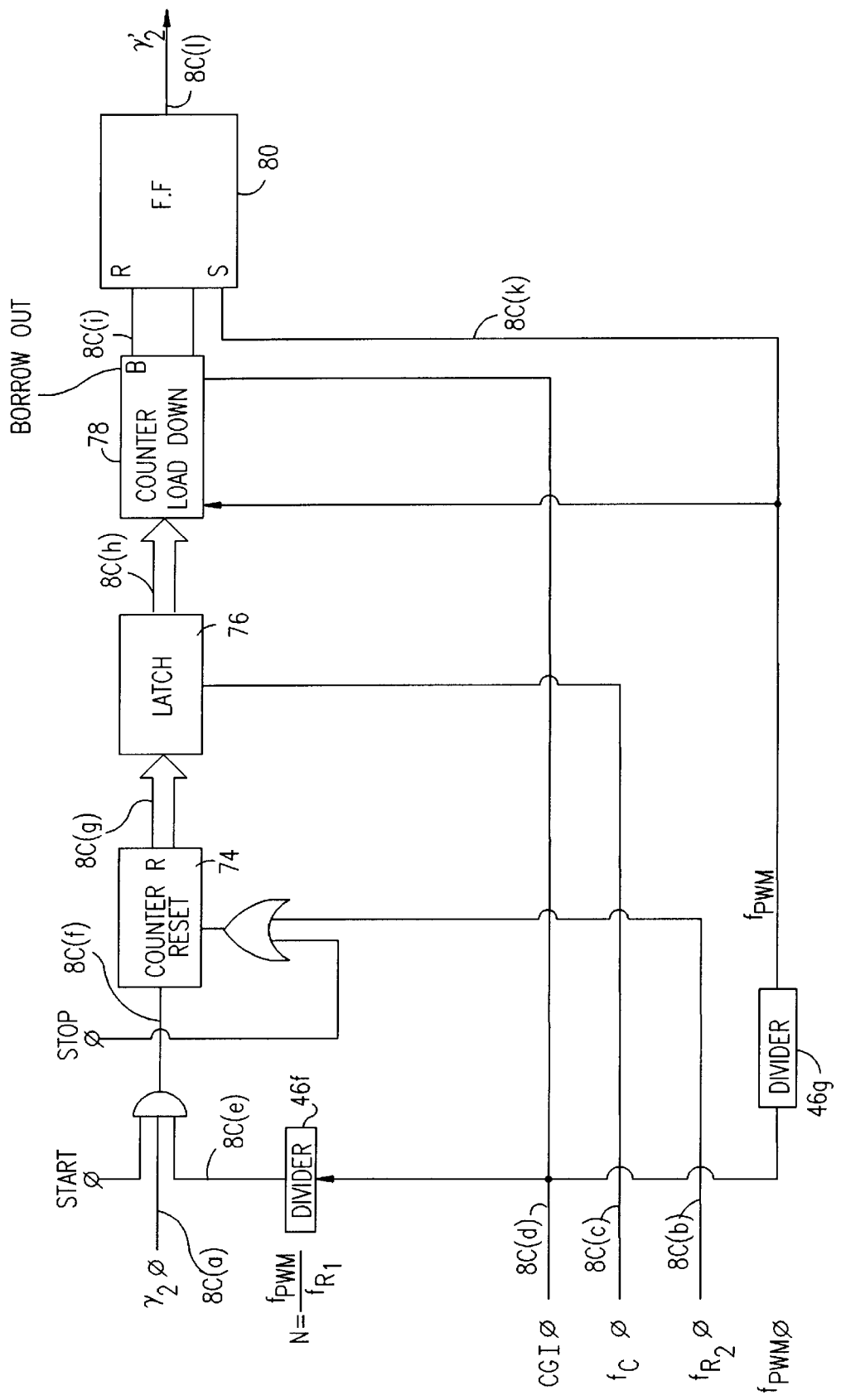
FIG. 8A is a schematic block diagram showing a high-frequency PWM converter, for use in the controller of FIG. 2A, in accordance with a preferred embodiment of the present invention.
Figure 8B:
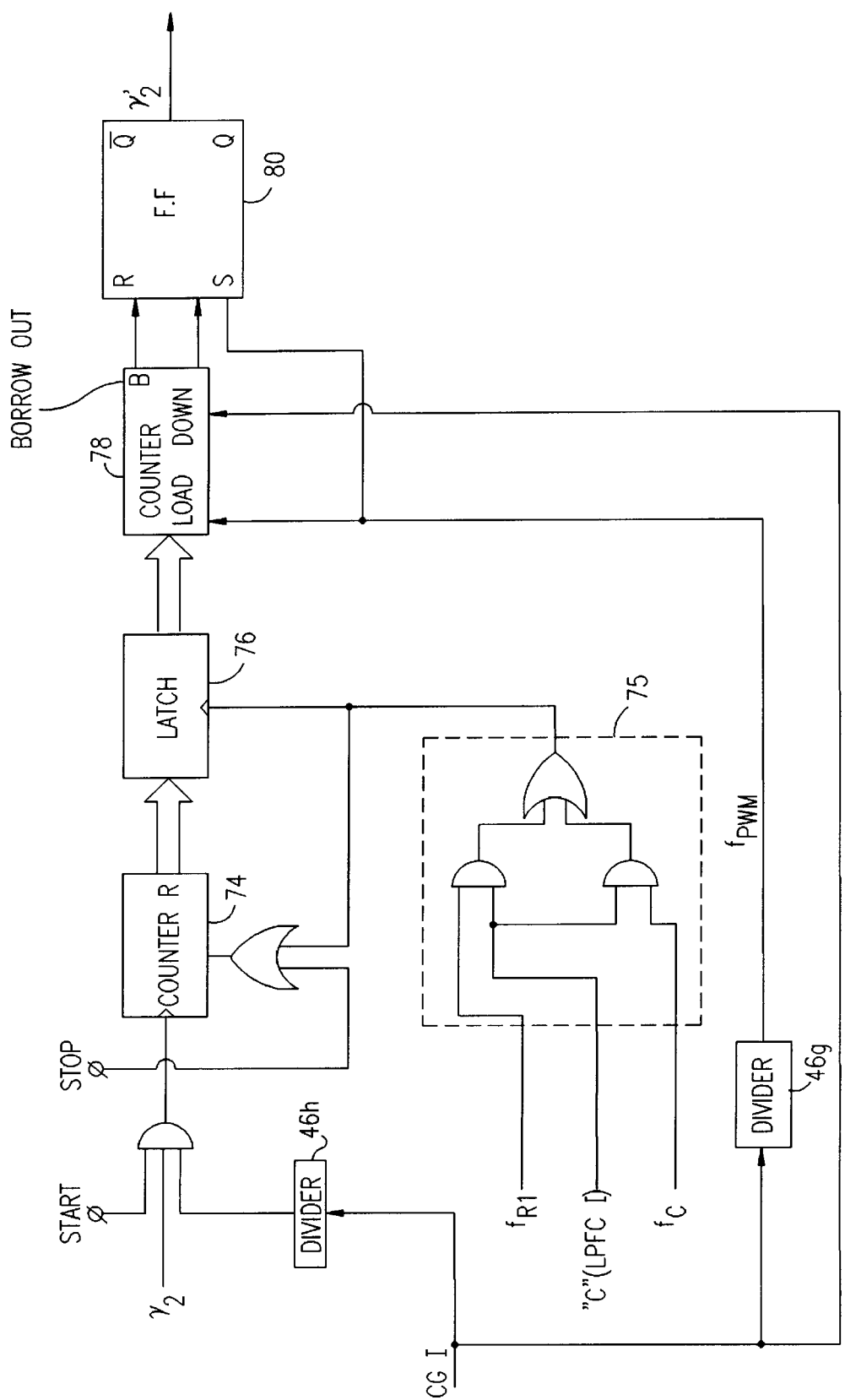
FIG. 8B is a schematic block diagram showing a high-frequency PWM converter, for use in the controller of FIG. 2A, in accordance with another preferred embodiment of the present invention.
Figure 8C:
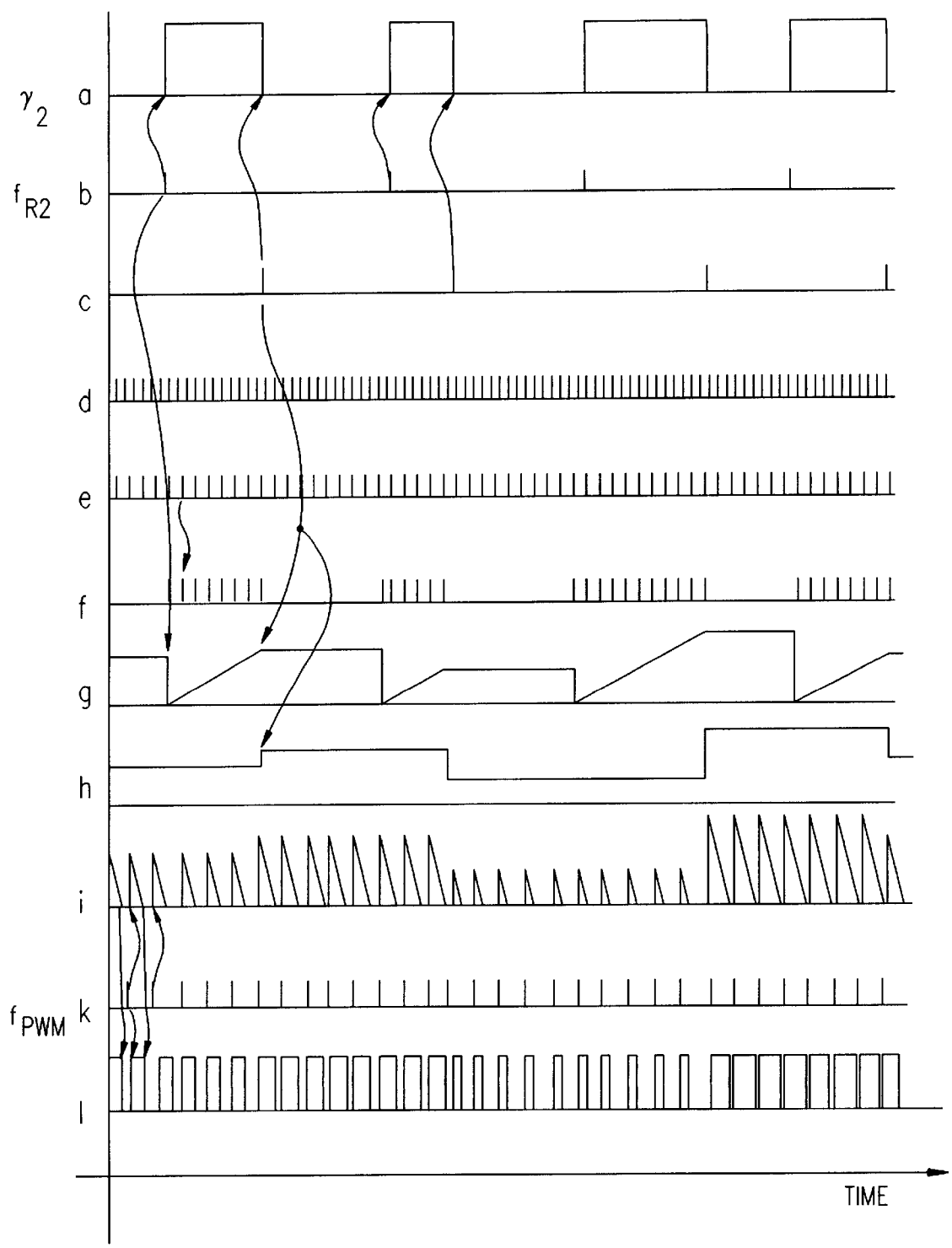
FIG. 8C is a timing diagram showing signals in the circuit of FIG. 8A, in accordance with a preferred embodiment of the present invention.

Reference is now made to FIGS. 8A through 8C. FIG. 8A is a block diagram showing a high-frequency PWM converter 38a for forward operation of controller 21 and motor 20, and FIG. 8B is a block diagram showing a PWM converter 38b for reverse operation. FIG. 8C is a timing diagram of converter 38a shown in FIG. 8A. The embodiment of FIG. 8B is generally similar in operation to that of FIG. 8A, with the exception of circuit 75 in FIG. 8B, which enables converter 38b to count-up during both CW and CCW operation, as opposed to converter 38a, which counts-up only during CW operation of the controller. It will be observed that counter 74 in the embodiment of FIG. 8B counts up following either a $f_c$ or a $f_R$ signal, i.e., in CW or CCW operation respectively.

Converter 38a receives duty cycle-modulated signal 8C(a), which is output by control circuit 40, along with clock signal 8C(d) and feedback and corrected reference signals 8C(c) and 8C(d), all as described above. A divider 46f, with coefficient, $$N = \frac{f_{PWM}}{f_{RI}},$$

generates a modified clock signal 8C(e) and a second divider 46g generates a second modified clock signal 8C(k) having a frequency $f_{PWM}$ input to flip flop 80.

A counter 74 receives an input pulse train 8C(f), derived from inputs 8C(a) and 8C(e), and generates an integral output 8C(g), which is input to latch 76. A load-down counter 78 receives output 8C(h) from latch 76, and generates amplitude modulated signal 8C(i), which is input to a RS flip-flop 80 together with clock signal 8C(k). Flip-flop 80 thus outputs a high-frequency PWM signal, shown in trace 8C(l), which is input to motor drive 36.

It will be observed that the PWM signal output by PWM converter 38, shown in trace 8C(l), has a substantially higher frequency than the feedback and reference signals, shown in traces 8C(b) and 8C(c). As a result, the speed, phase and position accuracy of controller 21 will be considerably higher than in controllers known in the art. Even when a conventional drive 36 is used to drive motor 20, high-frequency converter 38 will improve the motor's accuracy in tracking the speed, phase and position reference values that are input to the controller.

It will be appreciated that the preferred embodiments described above are cited by way of example, and the full scope of the invention is limited only by the claims.

What is claimed is:

1. A controller for an electric motor, comprising:

a reference circuit which generates a reference signal having a phase and frequency determined in accordance with a set of motion parameters input to the circuit; and control circuitry, which receives the reference signal and receives a feedback signal from a rotation detector coupled to the motor, the detector having an inherent angular rotational resolution, and compares the reference signal and the feedback signal to generate a drive signal used to drive the motor at a speed and phase of rotation determined by the frequency and phase of the reference signal, the phase of rotation of the motor being locked to the phase of the reference signal such that deviation of the phase of rotation relative to the phase of the reference signal at steady state is substantially smaller than the rotational resolution of the rotation detector, wherein the control circuitry comprises a first phase-frequency comparator, which generates a phase-frequency signal responsive to the deviation between the phase of the reference and the phase of rotation of the motor, and wherein the phase-frequency signal is processed to generate the drive signal, and wherein the control circuitry comprises an integration circuit, which receives and integrates the phase-frequency signal to generate a modified phase-frequency signal, responsive to the phase-frequency signal and the feedback signal, wherein the modified phase-frequency signal is characterized by a second-order astatism.

2. A controller according to claim 1, wherein the integration circuit comprises a second phase-frequency comparator.

3. A controller according to claim 1, wherein the reference signal and the control circuitry receive a first clock signal, and generate the reference and phase-frequency signals responsive thereto, and wherein the integration circuit receives a second clock signal, asynchronous with the first clock signal, and uses the second clock signal to generate the modified phase-frequency signal.

4. A controller according to claim 1, and further comprising an additional integration circuit, which receives and integrates the modified phase-frequency signal to generate a further modified phase-frequency signal characterized by a third or higher order astatism.

5. A controller according to claim 1, wherein the modified phase-frequency signal comprises a pulse-width modulated signal.

6. A controller according to claim 1, wherein the control circuitry comprises a pulse add-remove circuit, which combines the reference and feedback signals to provide a sequence of pulses, which is processed to provide an input to the phase-frequency comparator, such as to enable continuous control of the operation of the motor when it rotates at a speed substantially lower than the reference speed.

7. A controller according to claim 6, wherein the motor rotates at a speed less than 10 rpm.

8. A controller according to claim 7, wherein the rotation speed is less than 1 rpm.

9. A controller according to claim 8, wherein the rotation speed is less than 0.1 rpm.

10. A controller for an electric motor, comprising:

a reference circuit which generates a reference signal having a phase and frequency determined in accordance with a set of motion parameters input to the circuit;

control circuitry, which receives the reference signal and receives a feedback signal from a rotation detector coupled to the motor, and compares the reference signal and the feedback signal to generate a drive signal used to drive the motor at a speed and phase of rotation determined by the frequency and phase of the reference signal, such that when the frequency of the reference signal is changed to a new frequency thereof, the control circuitry generates the drive signal such that the speed of rotation of the motor changes to a new speed, determined by the new frequency, substantially without overshoot or undershoot, wherein the feedback signal is a periodic signal having a frequency and phase dependent on the rotation of the motor, and wherein the control circuitry comprises a phase-frequency comparator, which generates a signal responsive to a phase deviation between the phase of the reference signal and the phase of rotation of the motor, wherein the signal is processed to generate the drive signal; and an automatic phasing circuit, which controls the phase-frequency comparator responsive to a change in the motion parameters, so as to prevent the overshoot or undershoot, wherein the phase-frequency comparator comprises an edge-controlled digital memory network, having a plurality of states, wherein the network makes transitions among the plurality of states responsive to the reference and feedback signals input to the comparator, and wherein the signal generated by the comparator is dependent on the state of the network, and wherein the automatic phasing device controls the transitions among the states.

11. A controller according to claim 10, wherein the plurality of states comprises five states, having ten possible transitions therebetween.

12. A controller according to claim 10, wherein the five states comprise two saturation states, two work states and a zero state.

13. A controller for an electric motor, comprising:

a reference circuit which generates a reference signal having a phase and frequency determined in accordance with a set of motion parameters input to the circuit; and control circuitry, which receives the reference signal and receives a periodic feedback signal, having a frequency and phase dependent on the rotation of the motor, from a rotation detector coupled to the motor, and compares the reference signal and the feedback signal to generate a drive signal used to drive the motor at a speed and phase of rotation determined by the frequency and phase of the clock signal, the drive signal comprising a sequence of pulses having a pulse repetition frequency substantially higher than the frequency of the feedback signal, wherein the sequence of pulses in the drive signal comprises a series of pulse bursts, wherein the number of pulses in each burst is generally dependent on a phase deviation between the phase of the reference and the phase of rotation of the motor.

14. A controller for an electric motor, comprising:

a clock generator, which generates a clock signal having a substantially constant frequency;

a reference circuit which generates a reference signal responsive to the clock signal, having a phase and frequency determined in accordance with a set of motion parameters input to the circuit, such that the phase and frequency may be varied substantially continuously in response to the motion parameters; and control circuitry, which receives the reference signal and receives a feedback signal from a rotation detector coupled to the motor, and compares the reference signal and the feedback signal to generate a drive signal used to drive the motor at a speed and phase of rotation determined by the frequency and phase of the reference signal, wherein the reference circuit comprises one or more programmable frequency dividers and one or more programmable frequency multipliers, which receive the clock signal and the motion parameters and produce the reference signal, and wherein at least one of the one or more dividers and at least one of the one or more multipliers are arranged in series, and wherein the one or more multipliers and one or more dividers include two pairs of one multiplier and one divider each, each pair arranged in series, and the two pairs arranged mutually in parallel.

15. A controller for an electric motor, comprising:

a clock generator, which generates a clock signal having a substantially constant frequency;

a reference circuit which generates a reference signal responsive to the clock signal, having a phase and frequency determined in accordance with a set of motion parameters input to the circuit, such that the phase and frequency may be varied substantially continuously in response to the motion parameters; and control circuitry, which receives the reference signal and receives a feedback signal from a rotation detector coupled to the motor, and compares the reference signal and the feedback signal to generate a drive signal used to drive the motor at a speed and phase of rotation determined by the frequency and phase of the reference signal, wherein the reference circuit comprises a phase-frequency comparator and a pulse add-remove circuit, which adjust the reference signal responsive to a change in the set of motion parameters, so that the motor is driven to respond to the change substantially continuously.

16. A controller for an electric motor, comprising:

a clock generator which generates first and second mutually asynchronous clock signals, each having a known phase and frequency;

a reference circuit which receives the first clock signal, and generates a reference signal having a phase and frequency determined in accordance with a set of motion parameters input to the circuit; and control circuitry, which receives the second clock signal and the reference signal and receives a feedback signal from a rotation detector coupled to the motor, and compares the reference signal and the feedback signal to generate a drive signal based on the second clock signal, wherein the drive signal is used to drive the motor at a speed and phase of rotation determined by the frequency and phase of the reference signal.

17. A controller according to claim 16, wherein the phase of rotation of the motor is locked to the phase of the reference signal, immediately after the motor speed reaches the reference speed value, such that deviation of the phase of rotation relative to the phase of the reference signal at steady state is substantially smaller than an inherent angular rotational resolution of the rotation detector.

18. A controller according to claim 16, wherein the control circuitry comprises a phase-frequency comparator, which uses the second clock signal to generate a phase-frequency signal responsive to the deviation between the phase of the reference and the phase of rotation of the motor.

19. A controller according to claim 18, wherein the controlling circuitry comprises one or more duty cycle to phase frequency converters and one or more logic phase-frequency comparators, arranged in series, to generate the drive signal.

20. A controller according to claim 16, and further comprising a motor drive, which receives the drive signal from the control circuitry and drives the motor responsive thereto.

21. A method for controlling an electric motor, comprising:

generating a reference signal having a phase and frequency determined in accordance with a set of motion parameters input to the circuit;

receiving a feedback signal from a rotation detector coupled to the motor, the detector having a predetermined rotational resolution; and generating a drive signal by comparing the reference signal and the feedback signal, to drive the motor at a phase and speed of rotation determined by the frequency and phase of the reference signal, so that the phase of rotation of the motor is locked to the phase of the reference signal, immediately after the motor speed reaches the reference speed value, such that deviation of the phase of rotation relative to the phase of the reference signal at steady state is substantially smaller than the rotational resolution of the sensing device, wherein comparing the reference signal and the feedback signal comprises generating a phase-frequency signal responsive to the deviation between the phase of the reference and the phase of rotation of the motor, and wherein the phase-frequency signal is processed to generate the drive signal, and wherein generating the drive signal comprises integrating the phase-frequency signal to generate a modified phase-frequency signal, responsive to the phase-frequency signal and the feedback signal, wherein the modified phase-frequency signal is characterized by a second-order astatism.

22. A method according to claim 21, wherein integrating the phase-frequency signal comprises comparing a phase of the phase-frequency signal to the phase of the feedback signal.

23. A method according to claim 21, wherein generating the reference and phase-frequency signals comprises generating the signals responsive to a first clock input, and wherein generating the modified signal comprises generating the signal responsive to a second clock input, asynchronous with the first clock input.

24. A method for controlling an electric motor, comprising:

generating a reference signal having a phase and frequency determined in accordance with a set of motion parameters input to the circuit;

receiving a feedback signal from a rotation detector coupled to the motor, the detector having an inherent angular rotational resolution; and generating a drive signal by comparing the reference signal and the feedback signal, to drive the motor at a phase and speed of rotation determined by the frequency and phase of the reference signal, so that the phase of rotation of the motor is locked to the phase of the reference signal, immediately after the motor speed reaches the reference speed value, such that deviation of the phase of rotation relative to the phase of the reference signal at steady state is substantially smaller than the rotational resolution of the sensing device, wherein comparing the reference signal and the feedback signal comprises generating a phase-frequency signal responsive to the deviation between the phase of the reference and the phase of rotation of the motor, and wherein the phase-frequency signal is processed to generate the drive signal, and wherein generating the drive signal comprises integrating the phase-frequency signal to generate a modified phase-frequency signal, responsive to the phase-frequency signal and the feedback signal, wherein the modified phase-frequency signal is characterized by a second-order astatism, and integrating the modified signal to produce a further modified signal having a third- or higher-order astatism.

25. A method, for controlling an electric motor, comprising:

generating a reference signal having a phase and frequency determined in accordance with a set of motion parameters input to the circuit;

receiving a feedback signal from a rotation detector coupled to the motor, the detector having a predetermined rotational resolution; and generating a drive signal by comparing the reference signal and the feedback signal, to drive the motor at a phase and speed of rotation determined by the frequency and phase of the reference signal, so that the phase of rotation of the motor is locked to the phase of the reference signal, such that when the frequency of the reference signal is changed to a new frequency thereof, the rotation of the motor changes to a new speed, determined by the new frequency, substantially without overshoot or undershoot, wherein receiving the feedback signal comprises receiving a periodic signal having a frequency and phase dependent on the rotation of the motor, and wherein comparing the reference signal and the feedback signal comprises generating a phase-frequency signal responsive to a phase deviation between the phase of the reference and feedback signals, and wherein generating the phase-frequency signal comprises controlling a phase of the signal automatically responsive to a change in the motion parameters, so as to prevent the overshoot or undershoot, and wherein controlling the phase comprises controlling transitions among a plurality of states in an edge-controlled memory network.

26. A method for controlling an electric motor, comprising:

generating a reference signal having a phase and frequency determined in accordance with a set of motion parameters input to the circuit;

receiving a feedback signal from a rotation detector coupled to the motor, the detector having a predetermined rotational resolution; and generating a drive signal by comparing the reference signal and the feedback signal, to drive the motor at a phase and speed of rotation determined by the frequency and phase of the reference signal, so that the phase of rotation of the motor is locked to the phase of the reference signal, such that the drive signal comprises a series of pulses having a pulse repetition frequency substantially higher than the frequency of the feedback signal, wherein generating the drive signal comprises generating a series of pulse bursts, wherein the number of pulses in each burst is generally dependent on the phase deviation between the phase of the reference signal and the phase of rotation of the motor.

* * * * *